United States Patent
Blodgett et al.

(10) Patent No.: US 12,482,373 B2
(45) Date of Patent: Nov. 25, 2025

(54) METHOD FOR LEARNING TO READ USING SPECIALIZED TEXT

(71) Applicants: Sarah K. Blodgett, Ledyard, CT (US); Samuel Henry, Taylors, SC (US)

(72) Inventors: Sarah K. Blodgett, Ledyard, CT (US); Samuel Henry, Taylors, SC (US)

( * ) Notice: Subject to any disclaimer, the term of this patent is extended or adjusted under 35 U.S.C. 154(b) by 0 days.

(21) Appl. No.: 18/533,028

(22) Filed: Dec. 7, 2023

(65) Prior Publication Data
US 2024/0127709 A1    Apr. 18, 2024

Related U.S. Application Data

(63) Continuation-in-part of application No. 15/640,019, filed on Jun. 30, 2017, now Pat. No. 11,935,422.

(60) Provisional application No. 62/357,648, filed on Jul. 1, 2016.

(51) Int. Cl.
*G09B 17/02* (2006.01)
*G06F 40/109* (2020.01)

(52) U.S. Cl.
CPC ........... *G09B 17/02* (2013.01); *G06F 40/109* (2020.01)

(58) Field of Classification Search
CPC ........ G09B 17/00; G09B 17/02; G06F 40/109
See application file for complete search history.

(56) References Cited

U.S. PATENT DOCUMENTS

| | | |
|---|---|---|
| 4,655,713 A | 4/1987 | Weiss |
| 4,661,074 A | 4/1987 | Walker |
| 5,336,093 A | 8/1994 | Cox |
| 5,565,888 A | 10/1996 | Selker |
| 8,131,538 B2 | 3/2012 | Woodward |
| 8,543,914 B2 | 9/2013 | Klassen |
| D704,256 S | 5/2014 | Boer |
| 8,896,633 B2 | 11/2014 | Fino |
| 2004/0023191 A1 | 2/2004 | Brown et al. |
| 2007/0139412 A1 | 6/2007 | Stamm et al. |
| 2009/0132384 A1 | 5/2009 | Duncan et al. |
| 2010/0068682 A1 | 3/2010 | Su et al. |
| 2010/0068683 A1 | 3/2010 | Panec et al. |

(Continued)

FOREIGN PATENT DOCUMENTS

WO    2005086118 A2    9/2005

OTHER PUBLICATIONS

Canadian Office Action—Examiner requisition dated Sep. 13, 2023 issued in CA3028225.

(Continued)

*Primary Examiner* — Timothy A Musselman
(74) *Attorney, Agent, or Firm* — Blueshift IP; Robert Plotkin

(57) ABSTRACT

A method of providing an instructional scaffold to person learning to read English language comprises displaying printed matter to the learner in the form of lists. Preferably text stories. The normal spacing of the letters in words is kept intact; in a first part of the method the rime portions of monosyllable words are bolded and made larger than the onset portions; and in a second part of the method, which also may be used independently, the sequential syllables of multisyllable words are emphasized by alternating plain font with bolded font and the long vowels are identified, for example by underscore, again with the words of any text being kept intact.

8 Claims, 15 Drawing Sheets

(56) References Cited

U.S. PATENT DOCUMENTS

| | | | | |
|---|---|---|---|---|
| 2013/0253903 | A1* | 9/2013 | Stephen | G09B 19/06 704/9 |
| 2013/0273511 | A1 | 10/2013 | Terpstra et al. | |
| 2015/0066501 | A1* | 3/2015 | Thapliyal | G06F 16/5846 704/235 |

OTHER PUBLICATIONS

European Search Opinion dated Oct. 18, 2019; issued in EP17821406.
GB Examination Report dated Feb. 3, 2022 issued in GB1901141.0.
GB Examination Report dated Jul. 21, 2021 issued in GB1901141.0.
Final Office Action dated Feb. 1, 2023 issued in U.S. Appl. No. 15/640,019.
Final Office Action dated Jan. 22, 2020 issued in U.S. Appl. No. 15/640,019.
Final Office Action dated Sep. 9, 2021 issued in U.S. Appl. No. 15/640,019.
International Search Report dated Sep. 6, 2017 issued in PCT/US2017/040424.
Jordan Shapiro "Learning Tools for Microsoft One Note May be One of the Most Disruptive Education Technologies Yet"; Jan. 26, 2016; 5 pages; Forbes.com.
Miriam Cherkes-Julkowski, Ph.D.; "Read to Rime, Learn to Read"; (2005); pp. 1-7; Surviving Education Guides; Apache Junction, AZ.
Noah Text Releases Free, Easy-to-Use Tech Tool to Make Reading Easier for Dyslexic and Struggling Readers; https://www.24-7pressrelease.com/press-release/481622/noah-text-releases-free-easy-to-use-tech-tool-to-make-reading-easier-for-dyslexic-and-struggling-readers; retrieved from WebArchive on Jan. 29, 2024 (dated Dec. 1, 2022).
Non-Final Office Action dated Apr. 26, 2022 issued in U.S. Appl. No. 15/640,019.
Non-Final Office Action dated Jun. 12, 2019 issued in U.S. Appl. No. 15/640,019.
Non-Final Office Action dated Oct. 1, 2020 issued in U.S. Appl. No. 15/640,019.
Notice of Allowance dated Oct. 4, 2023 issued in U.S. Appl. No. 15/640,019.
Australian Patent Examination Report No. Jun. 1, 21, 2022 issued in AU2017286966.
StrongReader Works on Microsoft Edge; Browser Extensions created and tested internally at: https://chrome.google.com/webstore/detail/strongreader/fikpcalcdjahmldcgjmojdeokgoilcok and https://addons.mozilla.org/en-us/firefox/addon/strongreader/?utm_source=addons.mozilla.org&utm_medium=referral&utm_content=search; retrieved Jan. 9, 2024 (first published Feb. 2022).
Use our learning tools to help dyslexic and struggling readers; StrongReader Builder from Noah Text; https://app.noahtext.com/#/home; retrieved from WebArchive on Jan. 29, 2024 (dated Nov. 27, 2022).
Notice of Allowance dated Jan. 25, 2024 issued in U.S. Appl. No. 15/640,019.
"Noah Text—Making Reading Accessible for All Individuals". Noah Text. Youtube video. Available at: https://www.youtube.com/watch?v=N9r_11rd8K0. Dated: Mar. 3, 2021.

* cited by examiner

Franklin Noah Peterson lives in a small
New England coastal town called Port
Jonah. Frank, as he is called by friends
and family, is twelve years old. He has
wavy blond hair and big blue eyes. He is
of average build for his age. Some would
say he's a little quirky. He loves
animals and all things nature affords.
He loves to build crazy structures in his
backyard, especially for his backyard
chickens, to which he has ascribed
various names.

Franklin Noah Peterson lives in a small
New England coastal town called Port
Jonah. Frank, as he is called by friends
and family, is twelve years old. He has
wavy blond hair and big blue eyes. He is
of average build for his age. Some would
say he's a little quirky. He loves
animals and all things nature affords.
He loves to build crazy structures in his
backyard, especially for his backyard
chickens, to which he has ascribed
various names.

Franklin Noah Peterson lives in a small
New England coastal town called Port
Jonah. Frank, as he is called by friends
and family, is twelve years old. He has
wavy blond hair and big blue eyes. He is
of average build for his age. Some would
say he's a little quirky. He loves
animals and all things nature affords.
He loves to build crazy structures in his
backyard, especially for his backyard
chickens, to which he has ascribed
various names.

FIG. 7

Franklin Noah Peterson lives in a small
New England coastal town called Port
Jonah. Frank, as he is called by friends
and family, is twelve years old. He has
wavy blond hair and big blue eyes. He is
of average build for his age. Some would
say he's a little quirky. He loves
animals and all things nature affords.
He loves to build crazy structures in his
backyard, especially for his backyard
chickens, to which he has ascribed
various names.

FIG. 8

METHOD FOR LEARNING TO READ USING SPECIALIZED TEXT

CROSS-REFERENCE TO RELATED APPLICATIONS

This Continuation application is based on and claims priority to U.S. Nonprovisional patent application Ser. No. 15/640,019, filed on Jun. 30, 2017 (hereinafter referred to as the "'019 application"), in the U.S. Patent & Trademark Office, and U.S. Provisional Patent Application No. 62/357,648 filed Jul. 1, 2016 hereinafter referred to as the "648 application"). The '019 application is based on and claims priority to the '648 application, and the entire disclosure of the '019 application and the '648 application are incorporated herein by reference in their entireties.

TECHNICAL FIELD

The present invention relates to a system and method for helping persons how to read written language, particularly including aiding young persons with learning disabilities to read English more easily and quickly.

BACKGROUND OF THE INVENTION

People with learning disabilities, such as dyslexia, often struggle with learning how to read. In particular, certain children and some adults have cognitive abnormality (as distinguished from intelligence abnormality) in the brain neuroanatomy and functionality that are associated with language processing. They manifest inadequate working memory and phonemic awareness. And it is difficult for them to pay attention during the laborious process of learning how to read. Even when they succeed, they often have low fluency. People having learning problems can include those who have had physical/neurological illness with a result being a language disability, necessitating re-learning. Cross linguistic studies have shown that for normal learners it takes two to three times more instruction time and practice to learn to read the English language than that which is required by most other languages. That can be a disadvantage to an English language-based nation in that it impedes expeditious and efficient education of students. Some studies have indicated that as a result the United States educationally lags behind non-English language nations.

Compared to many other languages, the written English language has a very irregular orthography—i.e., that part of written language that deals with letters and spelling. In this application "English language" refers to an essential language comprised of Latin-derived letters, variations of which are manifested in countries such as the United States, United Kingdom, Canada, Australia, New Zealand, South Africa, Nigeria and other present day countries which were formerly colonies of Great Britain.

The irregular orthography of the English language makes learning to read the language difficult for a many learners. In particular, there is poor correspondence between graphemes (written symbols) and phonemes (spoken sounds) of the language. The learner reader who has a problem finds it particularly difficult to identify the most critical information or patterns within the English language writing system. That puts a greater burden on the working memory of the learner and thereby decreases the ability to acquire a phonological awareness and fluency. The result is often that the learner has sub-par fluency, learning speed and ultimate reading capacity. A learner of English language might be a young person in an English speaking household who has a learning disability, or might be a person seeking to learn English as a second language, or might be a person who has suffered a brain injury and needs to re-learn reading.

In the familiar human experience children are first taught individual sounds and oral language; they are then taught written language and the association of the sounds and oral language with such.

The patent literature manifests a number of techniques which have sought to aid those learning to read, particularly those with difficulties. In some of the methods, the learner is required to learn a set of unconventional graphic symbols that are superposed above the words of text. Reference may be made to the following U.S. Pat. No. 4,007,548 Cytanovich; U.S. Pat. No. 6,604,947 Rai; U.S. Pat. No. 5,336,093 Cox; U.S. Pat. No. 4,655,713 Weiss. See also U.S. Pat. Publication 2004/0178044 of Carter et al., and International Publication WO 2005/086118 of Oquist. See also U.S. Pat. No. 8,131,538 of Woodward which has an extensive description of features of English which make learning the language difficult, defines language-related terminology, and describes approaches taken to improve learning to read. It appears that the methodologies described in the patents either have met uneven success or, for whatever reason, have failed yet to be widely adopted to the exclusion of alternative approaches.

The general learning capability of some adults and children is facilitated by what is called "instructional scaffolding" or alternatively "scaffolded instruction." In such an approach the teacher breaks the subject matter into "chunks" (identifiable portions of subject matter), and there is a tool or structure associated with each chunk. Different types of instructional scaffolds may be used. For example, visual aids such as cue cards may be used to learn a language. If instructional scaffolding can be effectively applied to language learning, learners may find less burdensome the acquiring of a capacity to read well.

In the U.S. today, young students are commonly exposed to a blend of two main methods of reading instruction, commonly referred to as "whole language" and "phonics". Whole language emphasizes meaningful reading experiences by exposing the student to rich text literature. The student is required to memorize high frequency words and is drawn to picture clues in order to read text. Phonics instruction focuses on letter-sound correspondence and spelling patterns to aid the student. Ideally, this is done in an explicit and systematic manner and emphasizes phonemic awareness.

SUMMARY

An object of the invention is to provide a methodology and system for imparting reading skills to persons who have learning difficulties or for whom English is a second language. A further object of the invention is to provide a way of displaying English language words and text in a way that simulates predictable orthographies that are present in certain other languages, while keeping the current irregular orthographies of the English language intact. A still further object is to provide a method which helps reading while being compatible with the whole language and phonics methods mentioned in the background In the method and system of the present invention, there is provided a serial "instructional scaffolding", upon removal of which the successful learner will have gained reading skill. The invention comprises use of lists of words and text which are especially composed for teaching effect and selected words are modified in appearance.

In embodiments of the present invention, for teaching a beginner person how to read, the learner is displayed printed matter which is comprised of monosyllable words which are intact (by having conventional letter-to-letter spacing), and the letters of the rime portion of words are emphasized by being more visually intense—as by being bolded letters, optionally also with larger font. The onset portion of the word has letters in plain font. In combination with that step, the long vowels are delineated, as by underscoring or another identifier.

In a further part of the method embodiment, which may be used after the foregoing first part, or which may be used independently, the learner is displayed printed matter comprised of a combination of monosyllable words and multisyllable words. The monosyllable words are presented in plain text while the multisyllable words are written using two different fonts of typeface, the fonts alternating with each other from one syllable to the next syllable within the word. In addition, the long vowels including those with schwa sound are differentiated from non-long vowels. Different fonts include those which are bolded or colored or have otherwise significantly different visual impact. All the words in a text are intact with no separation or other demarcation of syllables, for the purpose of orienting the learner toward text of the kind which is encountered outside the learning environment.

The nature of the printed matter may vary: more preferably the matter comprises text in story form, alternatively lists or other presentations. The printed matter may be displayed on different media, including in books, as lists or cards, and on electro-optical displays. The printed matter embodying the invention methodology is most preferably a text comprised of sentences, communicating a fiction or non-fiction story or narrative, with or without pictures. Carrying out the invention in such a way imparts context to the words as they are emphasized and modified, and imparts fluency in reading.

In the present invention, the foregoing instructional scaffolding comprised of displayed printed word lists or texts is used to support the learner until a task is mastered. Then the scaffold is gradually removed. In the invention the current irregular orthography of English language is maintained in that words are keep intact since there is no change in letter spacing. Yet, by simulating predictable orthographies, the invention alleviates the burden English orthography places on a learner's working memory and shortens the instructional time needed to obtain reading fluency and improved reading speed.

The present invention complements the current familiar methods used in U.S. classrooms today, as mentioned in the Background. At the same time, the invention highlights critical patterns in the words of the text that the phonics method embraces to help the child decode and thus read with fluency and ease. The invention builds reading skill while students are reading text, thus bringing predictability to the numerous words students are otherwise required to memorize.

The foregoing and other objects, features and advantages of the present invention will become more apparent from the following description of preferred embodiments and accompanying drawings.

According to an aspect of the disclosure, a server system may comprise: a network communication interface; and processing circuitry configured to: receive a webpage request from a user electronic device via a browser extension; access text associated with a webpage corresponding to the webpage request; process the accessed text to generate specialized text; and transmit, to the user electronic device, webpage information with the specialized text as a response to the webpage request such that a display of the user electronic device display the webpage with the specialized text. The processing circuitry may be further configured to process the accessed text to generate the specialized text by: detecting a plurality of orthographic multisyllable words in a text; finding or detecting two or more syllables in at least one orthographic multisyllable word by examining each of the detected orthographic multisyllable words; and causing the electronic display to display a modified version of the text that adds emphasis to a first syllable of the two or more syllables by displaying the first syllable of the two or more syllables in an emphasized font, while leaving a second syllable of the two or more syllables in an original non-emphasized font.

The modified version may include graphically distinguishing an orthographic long vowel from an orthographic short vowel. The graphically distinguishing the orthographic long vowel from the orthographic short vowel may include underscoring the orthographic long vowel, while not underscoring the orthographic short vowel.

The processing circuitry may be further configured to process the accessed text to generate the specialized text by: detecting a plurality of orthographic monosyllable words and a plurality of orthographic multisyllable words in a text; finding or detecting two or more syllables in at least one orthographic multisyllable word by examining each of the detected orthographic multisyllable words; and causing the electronic display to display a modified version of the text that adds emphasis to a first syllable of the two or more syllables by displaying the first syllable of the two or more syllables in an emphasized font, while leaving a second syllable of the two or more syllables in an original non-emphasized font, and leaving the orthographic monosyllable words in the original non-emphasized font.

The modified version may include graphically distinguishing orthographic long vowels from orthographic short vowels in at least one of the plurality of orthographic monosyllable words or the plurality of orthographic multisyllable words.

The graphically distinguishing the orthographic long vowels from the orthographic short vowels in the at least one of the plurality of orthographic monosyllable words or the plurality of orthographic multisyllable words may include underscoring the orthographic long vowels in the at least one or more of the plurality of orthographic monosyllable words and/or the plurality of orthographic multisyllable words, while not underscoring the orthographic short vowels.

The processing of the accessed text to create the specialized text may include: generating a list of words associated with long vowels of each word; using a dictionary API to determine syllable breakdowns of each word; and using at least one of: a parts of speech analyzer and/or a document converter to provide a modified version of the text.

The spacing between letters of the plurality of multisyllable words in the modified version may be in accord with a standard typography, and/or the sequential syllables may be emphasized by alternating plain font with bolded font. The emphasized font may be a bolded font, and the original non-emphasized font may be not bolded.

According to an aspect, an electronic method implemented by a server system may be provided, the electronic method comprising: receiving, via a network communication interface, a webpage request from a user electronic device running a web browser extension; accessing text associated with a webpage corresponding to the webpage request; processing the accessed text to generate specialized text; and transmitting, to the user electronic device, webpage information with the specialized text as a response to the webpage request such that a display of the user electronic device display the webpage with the specialized text.

The electronic method may further comprise: processing the accessed text to generate the specialized text by: detecting, by using software, a plurality of orthographic multisyllable words in the text; finding or detecting two or more syllables in at least one orthographic multisyllable word by examining each of the orthographic multisyllable words; and causing an electronic display to display a modified version of the text that adds emphasis to a first syllable of the two or more syllables by displaying the first syllable of the two or more syllables in an emphasized font, while leaving a second syllable of the two or more syllables in an original non-emphasized font.

According to an aspect of the disclosure, a non-transitory computer-readable medium may be provided that comprises computer-executable instructions that, when executed by processing circuitry, cause the processing circuity to perform the real time responsive server method and/or the electronic method.

According to an aspect, an electronic device comprising: a computer including software configured to cause the computer to: find, using reference works, the computer's knowledge, and/or artificial intelligence, a plurality of orthographic monosyllable words in a text; analyze and divide at least one orthographic monosyllable word of the plurality of orthographic monosyllable words into at least one orthographic syllable onset portion and at least one orthographic syllable rime portion, wherein the orthographic syllable onset portion comprises an orthographic consonant portion of an orthographic syllable of the at least one orthographic monosyllable word, the syllable rime portion comprises at least one letter starting with a vowel after the syllable onset portion in the at least one monosyllable word, and the syllable rime portion ends at an end of the syllable; and cause an electronic display to display a screen created by the software, the screen including a modified version of the text that adds emphasis to the syllable rime portion of the at least one monosyllable word by using an emphasized font, while leaving the syllable onset portion of the at least one monosyllable word in an original non-emphasized font, wherein spacing between letters of the plurality of monosyllable words in the modified version is in accord with a standard typography.

The emphasized font may be a bolded font, and the original non-emphasized font may not be bolded.

The modified version may include graphically distinguishing an orthographic long vowel from an orthographic short vowel. The graphically distinguishing the orthographic long vowel from the orthographic short vowel includes underscoring the orthographic long vowel, while not underscoring the orthographic short vowel.

The emphasized font may be a bolded font, and the original non-emphasized font may be not bolded. The emphasized font may be a bolded font, and the original non-emphasized font may be not bolded. The emphasized font may be bolded and may have a larger size than the original non-emphasized font, and the original non-emphasized font may be not bolded.

The orthographic monosyllable words of the modified version and the orthographic monosyllable words of the text correspond to words of a Latin-derived language and/or an English-derived language.

The emphasized font may be bolded and may be a first font theme and the original non-emphasized font may be not bolded and may be a second font theme that is different than the first font theme. The computer including the software may be configured to cause the computer to: ascertain a plurality of orthographic multisyllable words in a text; ascertain a plurality of orthographic multisyllable words in a second text; find two or more syllables in at least one orthographic multisyllable word by examining each of the orthographic multisyllable words; cause the electronic display to display a second screen created by the software, the second screen including a modified version of the second text that adds emphasis to a first syllable of the two or more syllables, while leaving a second syllable of the two or more syllables in an original non-emphasized font, wherein spacing between letters of the plurality of multisyllable words in the modified version of the second text is in accord with a standard typography.

According to an aspect, a computerized method implemented by a computer, the computerized method comprising: finding, by using software of a computer and one or more of reference works, the computer's knowledge, and/or artificial intelligence, a plurality of orthographic monosyllable words in a text; analyzing and dividing at least one orthographic monosyllable word of the plurality of orthographic monosyllable words into at least one orthographic syllable onset portion and at least one orthographic syllable rime portion, wherein the orthographic syllable onset portion comprises an orthographic consonant portion of an orthographic syllable of the at least one orthographic monosyllable word, the syllable rime portion comprises at least one letter starting with a vowel after the syllable onset portion in the at least one monosyllable word, and the syllable rime portion ends at an end of the syllable; and causing an electronic display to display a screen created by the software, the screen including a modified version of the text that adds emphasis to the syllable rime portion of the at least one monosyllable word by using an emphasized font, while leaving the syllable onset portion of the at least one monosyllable word in an original non-emphasized font, wherein spacing between letters of the plurality of monosyllable words in the modified version is in accord with a standard typography.

The emphasized font is a bolded font, and the original non-emphasized font is not bolded. The modified version includes graphically distinguishing an orthographic long vowel from an orthographic short vowel.

The graphically distinguishing the orthographic long vowel from the orthographic short vowel includes underscoring the orthographic long vowel, while not underscoring the orthographic short vowel and the emphasized font is a bolded font and the original non-emphasized font is not bolded.

The computerized method may further comprising: ascertaining a plurality of orthographic multisyllable words in a second text; finding two or more syllables in at least one orthographic multisyllable word by examining each of the orthographic multisyllable words; causing the electronic display to display a second screen created by the software, the second screen including a modified version of the second text that adds emphasis to a first syllable of the two or more syllables, while leaving a second syllable of the two or more syllables in an original non-emphasized font, wherein spacing between letters of the plurality of multisyllable words in the modified version of the second text is in accord with a standard typography.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is the sample paragraph with multisyllabic and monosyllabic words, in plain text;

FIG. 6 is the sample paragraph of FIG. 8 with only syllables identified;

FIG. 7 is the sample paragraph of FIG. 8 with only the long vowels identified;

FIG. 8 is the sample paragraph of FIG. 8 with both syllables and long vowels identified.

DESCRIPTION

Networked System

Figure 1A:
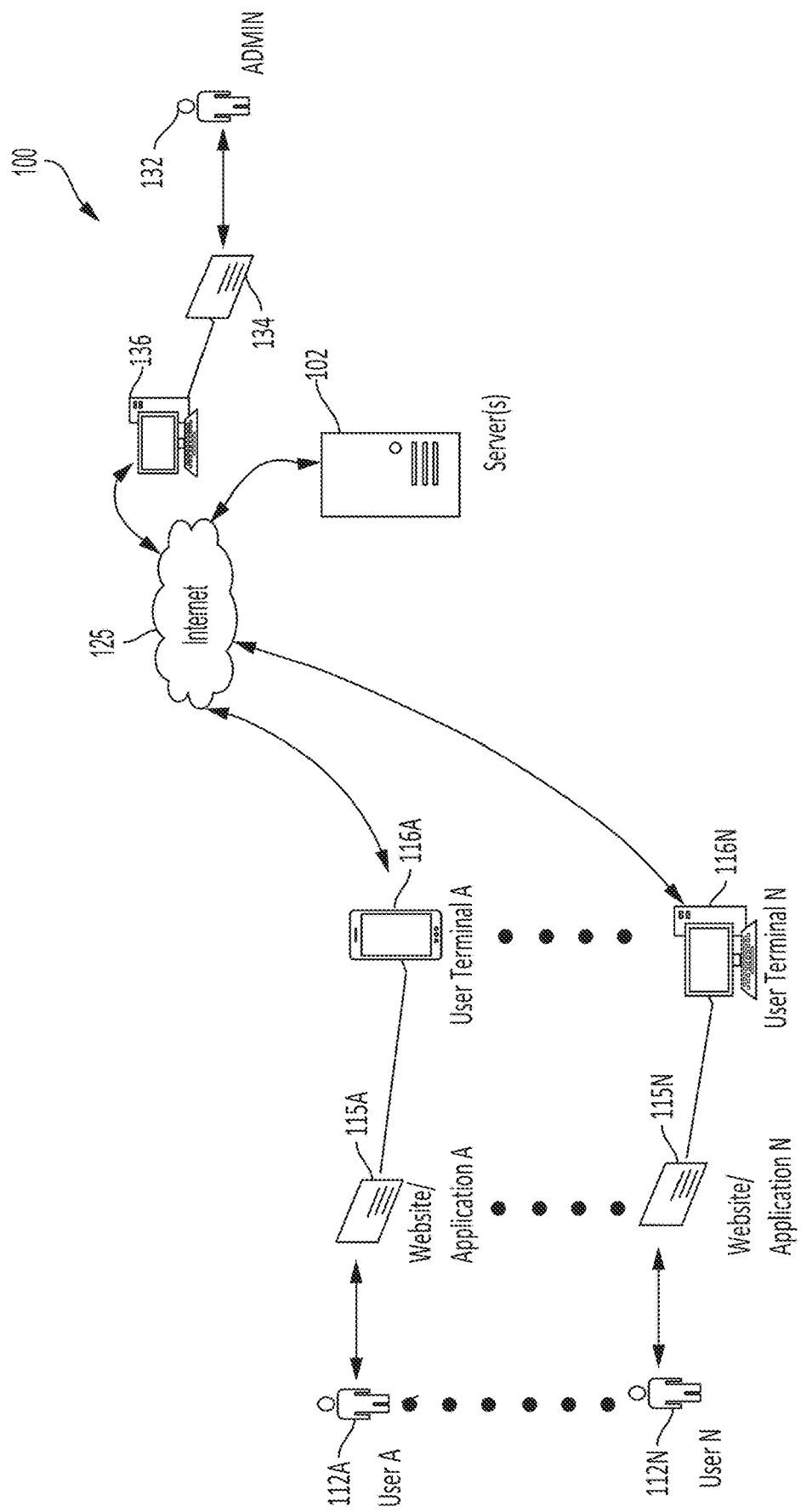
FIG. 1A illustrates a diagram of a networked computer system that may execute a method, according to an embodiment.

FIG. 1A illustrates a diagram of a networked computer system 100 that may execute a method according to certain embodiments. The networked computer system 100 may be a reading enhancement system 100 for electronic devices, such as an e-reader, smartphone, tablet or personal computer. The networked computer system 100 may include one or more responsive servers (e.g., server 102) one or more electronic display devices, such as a plurality of user terminals (e.g., User Terminal A (116A)-User Terminal N (116N), and Admin Terminal 136). Although three user terminals and one server are shown, the number of user terminals and servers may be more or less. Each user terminal device may be connected to one or more servers, and may also connect to one or more other electronic devices, such as with one or more of multiple user terminal devices (e.g., User Terminal 116A-User Terminal 116N) and/or a responsive server(s) 102.

The user terminals 116A-116N and 136 may be communicably connected (e.g., via a network 125, such as the Internet 125) to communicate with the responsive server(s) 102. The server(s) 102 may correspond to more than one networked server, such as a social media server and a user account server, and/or may involve distributed computing, parallel computing, a virtual server(s), cloud computing and the like. Although the processing is discussed on specific devices, the processing may be distributed.

The user terminals 116A-116N and 136 are electronic computing devices and shown as a smartphone 116A (a mobile electronic device) and a desktop computer (with a monitor) 116N, 136, respectively, but the user terminals may be any type of electronic computing device, such as a desktop personal computer (PC), a smartphone (mobile device), a tablet computer, a laptop computer, a personal digital assistant (PDA), an e-book reader, a connected smart speaker or a listening device, and the like.

According to an embodiment, the networked computer system 100 may include a plurality of user accounts stored in a database of the server(s) 102. Each of the user accounts may be associated with one or more users 112A-112N and may each correspond to a registered user account (e.g., where a User 112A-112N logs in to access the website/ applications 115A-115N via the user terminal 116A-116N). The server may also store one or more admin accounts for admin users (e.g., Admin User 122 accesses a website/app 124 via admin user terminal 136 to provide global updates, such as adjusting weights, or adjusting a weight adjusting algorithm, managing user accounts, etc.).

The user terminals 116A-116N and 136 may correspond to any electronic computing device that a respective user 112A-112N or 136 is logged into. In this respect, for example, when user 112A is logged into the website or application 114A, the current electronic computing device the user 112A is using is user 112A's user terminal 116A. When user 112A logs in from a different electronic computing device, that different electronic computing device is user 112A's user terminal 116A. The software may be application and/or webpage/portal driven, and hence, it does not matter which electronic computing device/user terminal a user logs into, as the application is accessible from different connected computing devices. The software corresponds to and/or includes the computer-executable instructions discussed below.

Admin Terminal 136 is an electronic computing device that has an admin user 132 logged in (e.g., via a webpage 134). An admin user 132 is a user designated as an administrator of the user accounts for the software service. The admin user terminal 136 may communicate with the other user terminals 116A-116N, and/or with responsive server(s) 102 over network 125.

As described above, the user terminals and/or responsive servers may perform and execute various tasks, operations and/or methods described herein. The responsive server(s) may perform some or all the processing with relation to the methods performed by the user terminals (electronic computing devices).

Electronic Device (User Terminal)

Figure 1B:
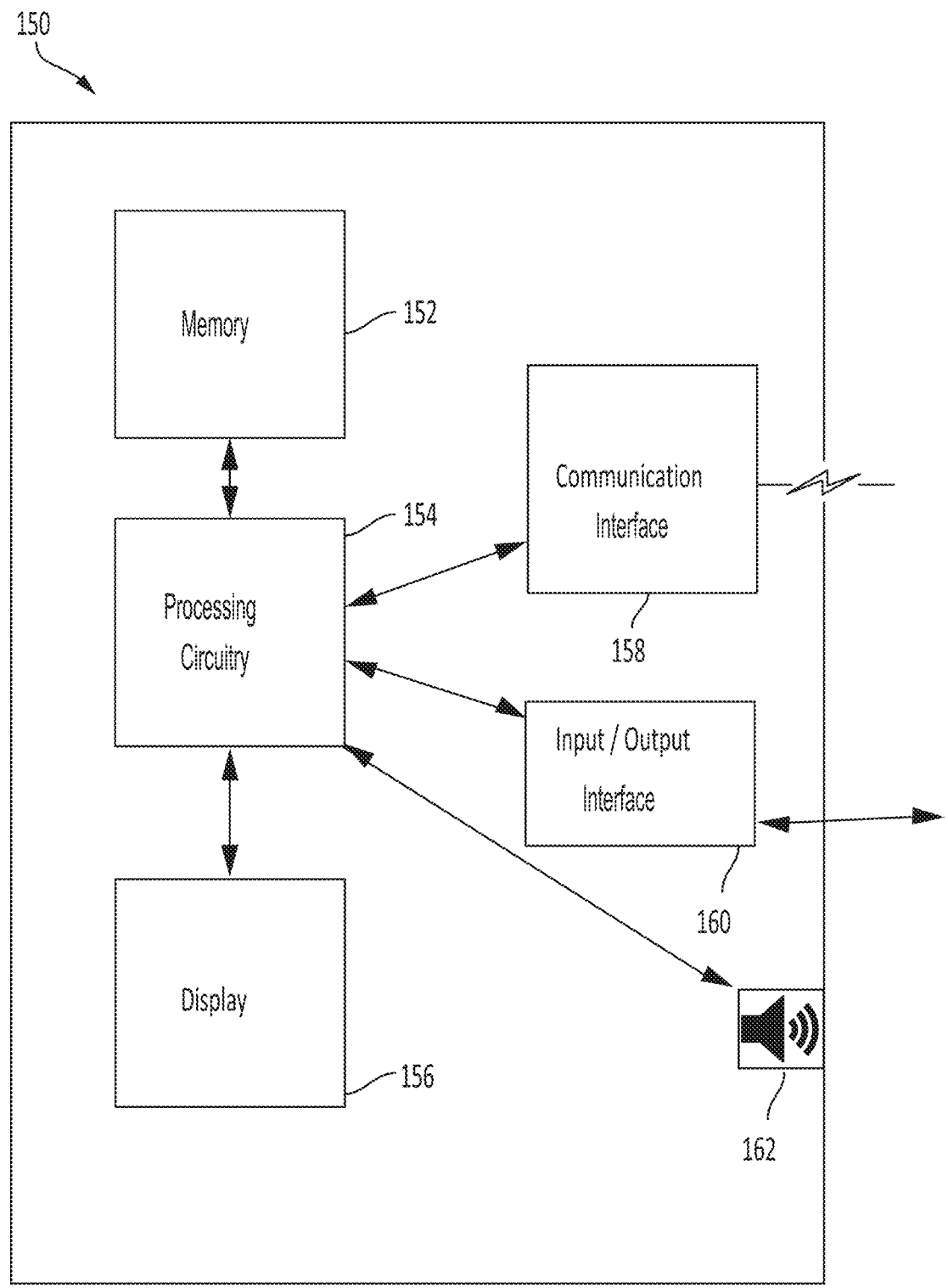
FIG. 1B illustrates a detailed view of an electronic computing device that can be used to implement the various components and/or methods described herein, according to certain embodiments.

FIG. 1B illustrates a detailed view of an electronic computing device 150 that can be used to implement the various components and/or methods described herein, according to certain embodiments. Any of the user terminals 116A-116N and 136 (and also server 102) may correspond to electronic computing device 150.

In an embodiment of the disclosure, as shown in FIG. 1B, the electronic computing device 150 may include one or more memories 152, processing circuitry 154 (e.g., a controller, a hardware processor), a display 156, a network communication interface 158, an input/output (I/O) interface 160 and a speaker 162. The speaker 162 may be internal or external (e.g., wireless headphones speakers).

The processing circuitry 154 may include and provide functionality by way of one or more processors (e.g., a hardware processor, a virtual processor, a distributed processor, central processing units (CPUs), a specialized processor, such as a Graphics Processing Unit (GPU), and/or Application Specific Integrated Circuits (ASICs)) executing computer-executable instructions (software) embodied in one or more tangible (non-transitory), computer-readable media. The computer-readable media may correspond to one or more memories 152, which may hereinafter be referred to as a memory 152. According to an embodiment, memory 152 may be a local memory 152 or local data storage 152. According to an embodiment, the memory 152 may include one or more of: media, a storage device, memory devices or chips, internal mass storage (e.g., Read-Only Memory (ROM), a Random-Access Memory (RAM)), a Compact Disc (CD), a Digital Versatile Disc (DVD), a thumb-drive, a removable hard drive, a solid-state drive, legacy magnetic media (e.g., a tape drive, a floppy disc drive), a specialized ASIC-based device, and/or the like.

The software implementing various embodiments of the present disclosure can be stored in the memory (e.g., storage devices and/or media) and executed by processing circuitry 154. "Computer readable media" or "computer readable medium" as used in connection with the disclosure include non-transitory media, transmission media, and/or carrier waves.

The computer readable media and/or memory 152 may store computer code/instructions (software) for performing various computer-implemented functions. The computer code may include instructions that, when executed by the processing circuitry 154, causes the processing circuitry to execute various functions, processes, parts, operations and/or methods (collectively referred to hereinafter as functions or operations). Reference to a computer-readable media can include a circuit (such as an integrated circuit (IC)) storing software for execution, a circuit embodying logic for execution, or both, where appropriate. The present disclosure includes any suitable combination of hardware and software.

The various functions, operations, and methods pertinent to this disclosure are explained in detail herein. The processing circuitry 154 may be configured to perform the various operations (e.g., by being programmed to do so via computer executable instructions) discussed in more detail herein.

The electronic computing device 150 may further include a communication interface 158 electrically coupled to the processing circuitry 154. The communication interface 158 may be configured to receive data transmitted from one or more electronic end user devices (e.g., user terminal devices, one or more Admin Terminal electronic devices, and/or other electronic devices) and/or one or more servers. The communication interface 158 may include a network communication interface 158. The communication interface 158 may be configured to transmit, via, for example, control by the processing circuitry 154, data to the one or more electronic computing devices over a network (wired or wirelessly), such as, via an interface to one or more communication networks (e.g., via the communication interface 158). The processing circuitry 154 may be configured to control (or cause) the display 156 to display information, or alternatively, transmit the to-be-displayed information over the communication interface 158, or over the input/output interface 160 to another electronic computing device (e.g., smartphone, computer monitor) for external display.

As shown in FIG. 1B, the electronic computing device 150 may also include or be at least configured to be electrically connected (or wirelessly connected) to one or more electronic input/output (I/O) devices, including peripheral output devices (e.g., external, or internal). The electronic computing device 150 may use the input/output (I/O) interface 160 to communicate with one or more external peripheral devices, such as, one or more of: a display device (e.g., an external desktop monitor, a touch screen display panel, etc.), a keyboard, a microphone (e.g., for voice input), a camera (e.g., for gesture input), a mouse, a speaker, a microphone, a joystick, a scanner, a trackpad, a printer, a sensor, and/or a biometric capture device (e.g., a device that captures one or more of: fingerprint, palm print, iris information, etc.). The peripheral devices may include user input devices (e.g., a mouse, keyboard, microphone) and/or output devices (e.g., speaker, display) and may be connected to the processing circuitry 154 by the I/O interface 160 or the network communication interface 158. The electronic display device may correspond to a smartphone and/or electronic computing device and include a touch-screen display device that is configured to detect an interaction (e.g., touch, tap or long or short press) with the touchscreen, and identify information (e.g., position on the display screen) regarding the interaction. The GUIs may be used to prompt for and/or receive user input, and also provide virtual buttons for navigation to multiple different GUI screens related to the electronic device. The information displayed by the GUIs may include touch menu buttons for navigating to sub-menus.

Throughout the drawings, it should be noted that like reference numbers are used to depict the same or similar elements, features, and structures.

The electronic display device may correspond to and/or be electronically coupled to the electronic computing device, the Admin Terminal and/or a server.

The I/O interface 160 may be wired (e.g., universal serial bus (USB) drive, external RAM/ROM, external processor, data port) or wireless (e.g., short-range communication protocols, syncing, Bluetooth®, radio frequency (RF), near field communication (NFC) or Wi-Fi®). The I/O interface 160 may be electrically coupled to the processing circuitry 154 and the processing circuitry 154 may be configured to control (or cause) the I/O interface 160 to transmit information between the device 150 and other electronic devices or peripherals. At least a portion of the network communication interface 158 and or the I/O interface 160 may be provided on an outer surface of a housing of an electronic computing/display device (e.g., a smartphone). The network communication interface 158 and or the I/O interface 160 may include similar and/or the same overlapping functionality.

The software may cause the processing circuitry and specifically the processor(s) to execute particular processes or particular parts of particular processes described herein, including defining data structures stored in memory (e.g., RAM) and modifying data structures according to the processes defined by the software. In addition, or as an alternative, the processing circuitry may provide functionality because of logic hardwired or otherwise embodied in a circuit, which can operate in place of or together with software to execute particular processes or particular parts of particular processes described herein. Reference to software can encompass logic, and vice versa, where appropriate.

Networks may be, for example, wired, wireless, or optical. Networks can provide real-time data transfer and include a local area network (LAN), a wide-area network (WAN), and/or the Internet. Examples of networks include Ethernet, wireless LANs, cellular networks (e.g., Global System for Mobile Communications (GSM)), 3G, 4G, 5G, Long-Term Evolution (LTE).

The display 156 may include any type of display including a projector or a display screen, such as, a touch screen display panel, an organic light-emitting diode (OLED) screen, a liquid crystal display (LCD) screen, a cathode ray tube (CRT) screen, and/or augmented reality glasses. The display 156 may be electrically coupled to the processing circuitry 154 and the processing circuitry 154 may be configured to control (or cause) the display 156 to display information (e.g., display the information discussed in the methods and operations below). The display 156 may be provided on an outer surface of a housing of an electronic computing/display device (e.g., a smartphone) or be an external display monitor connected to a standalone electronic computing device (e.g., a PC connected to a monitor, where the monitor is the display).

The speaker(s) 162 may include any type of speaker including a smartphone/tablet speaker(s) and/or wired or wireless headphone speakers (also referred to as earbuds). The speaker(s) 162 may be electrically coupled to the processing circuitry 154 and the processing circuitry 154 may be configured to control (or cause) the speaker(s) 162 to output sound, such as a notification. The speaker(s) 162 may be provided on an outer surface of a housing of an electronic display device (e.g., a smartphone) or be an external speaker. The speaker may include a microphone, or a microphone may be provided separately to record sound data, such as speech data.

Real Time Responsive Server(s)

Figure 1C:
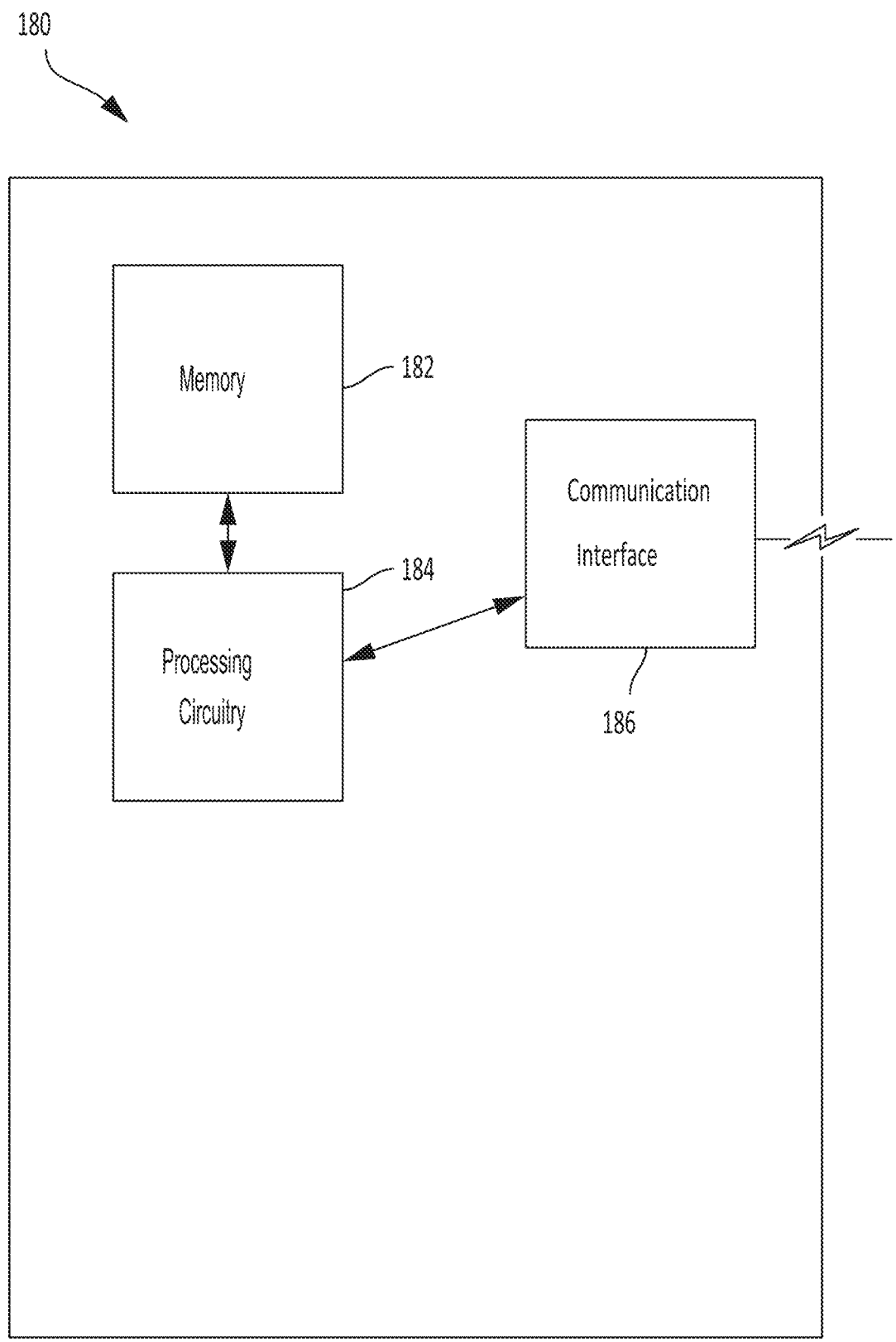
FIG. 1C illustrates a detailed view of a responsive server that can be used to implement the various components and/or methods described herein, according to some embodiments.

FIG. 1C illustrates a detailed view of a responsive server 180 that can be used to implement the various components and/or methods described herein, according to an embodiment(s). The responsive server(s) 102 in FIG. 1A may correspond to the responsive server 180 illustrated in FIG. 1C.

In an embodiment of the disclosure, as shown in FIG. 1C, the responsive server 180 may include one or more memories 182 (e.g., a local memory or local data storage), processing circuitry 184 (e.g., a controller, a hardware processor) and a communication interface 186 electrically coupled to the processing circuitry 184. The communication interface 186 may be configured to receive data transmitted from one or more external electronic computing devices (e.g., electronic computing devices 116A-116N, 136), and/or one or more other servers.

The processing circuitry 184 may be configured to store, in memory 182, data received from various sources over the network. For example, processing circuitry 184 may be configured to store information received as data received from the communication interface 186.

The responsive server 180 may be configured to provide automatic real time updates to the respective electronic computing devices, as discussed below. Real time may correspond to instantaneous, near real time (near instantaneous) or a combination thereof. The processing circuitry 184 may be connected to each of the other components of the server(s) 180 and may communicate, via communication interface 186, with one or more of the components of the electronic device 150 of FIG. 1B. The communication interface 186 may correspond to and include the same functionality as network communication interface 158 and/or I/O interface 160 discussed above.

Server Architecture

The server(s) 180 may include multiple servers that provide an application or Software as a Service (SaaS). Described below are some components that may be included that fit together to run the Noah Text (or text emphasis or specialized text) application. This application may be considered an assistive technology for people with dyslexia (in other words, like a dyslexia decoder). Noah Text (e.g., the application) may be a dyslexia decoder/assistive technology device. Studies strongly correlate developmental dyslexia with reduced sensitivity to print (or electronic display) regularities. The inconsistency of English exasperates this condition. There are approximately 470,000 words in the English language. By making critical patterns visible to individuals with reading disabilities (e.g., via using the specialized text and/or the modified version of the text), it enables them to decode words more fluently and accurately. Noah Text (the application or web browser) provides an innovative solution for the millions of struggling readers who are overwhelmed by English orthography and are lost in a sea of letters, unable to see these critical phonological and orthographic patterns for themselves, thus providing an external "prosthesis" for overcoming the obstacles that have been stunting their ability to succeed in higher level reading, higher education, better employment opportunities, and good mental health. Amazon Web Services: A portion (e.g., a majority) of the Noah Text (or text emphasis) application may be run on a global cloud infrastructure, such as Amazon Web Services (AWS). AWS is a cloud platform provided by Amazon, allowing developers and teams to build applications without worrying about hardware specifics like servers, databases, and more. AWS consists of well over 200 different services, of which the application may use about 10 (or 10 or more).

For example, the servers may run on AWS Lambda. Lambda is different from a traditional server in that is not always running; it may run only when it receives a command, according to an embodiment. The benefit of this approach is that the server cannot "crash," and pricing is based on usage.

The database, which may be stored on a server, may run on AWS Relational Database Service (RDS), which may provide access to common databases like MySQL, PostgreSQL, and more. In one embodiment, the application may use the PostgreSQL database.

Next, the application code, user documents, and the website itself may be stored in AWS Simple Storage Service (S3), which allows storing and retrieving of files at a low cost. Different files are stored in types of folder called "buckets." For example, the website is located in an app. noahtext.com bucket, which is configured as a "static site" bucket to allow browsers to access it. Also, the user documents may be stored in a Noah text-documents bucket.

Next, the emphasized text application (e.g., Noah Text application) may use a content delivery network (e.g., AWS CloudFront) to distribute the application content to an Internet Domain Registry (e.g., GoDaddy) (described below). CloudFront is a content delivery network made specifically for delivering content over the Internet.

The application (e.g., Noah Text) may use a few other AWS services, and in other embodiments the core services of an embodiment have been discussed above. AWS is a tool that makes it easy to deliver an application that is speedy, solid, and scalable.

An Internet Domain Registry (e.g., GoDaddy) may be used to secure rights to the uniform resource locator (URL) (e.g., noahtext.com) and to direct requests to different places (as discussed in the flowcharts below). For example, app.noahtext.com may be directed to the browser application, api.noahtext.com may be directed to the servers, and www.noahtext.com may be directed to the main website.

A web analytics service (e.g., Google Analytics) may be used to track user events, conversions, and other metrics. The web analytics service may provide a displayable view of an audience and to see common patterns and usage.

Tools: The following section describes the tools that may be used to detect words and parts of speech, and analyze words, parts of speech, and more things used in the application (Noah Text) algorithm.

Natural Language Toolkit

A suite of libraries and programs for symbolic and statistical natural language processing (NLP) for English written in the Python programming language (e.g., Python's Natural Language Toolkit (NLTK)) may be used to detect and determine the parts of speech within a section of text. The toolkit may take the text, analyze the words, and return the parts of speech of each word.

An open-source pronouncing dictionary (e.g., Carnegie Mellon University Pronouncing Dictionary, also called CMUDict) may provide a list of about 130,000 English words and their phoneme breakdowns. The dictionary may be used to generate a list of words associated with their long vowels.

WordsAPI

A dictionary API (e.g., WordsAPI dictionary) may be in a JSON format and provide a list of words (e.g., about 300,000 English words) with such data as syllables and parts of speech. The application (Noah Text) may use the dictionary API to determine the syllable breakdowns of each word.

Code: The following section describes the frameworks and programming languages used to create the Noah Text application.

Vue.js

Vue.js (Vue) is a Javascript framework used to make web pages fast and responsive. The user interface for the application (Noah Text) may be written in Vue. The interface may live on AWS S3.

Express.js

Express.js (Express) is a Javascript framework that may be used to make backend applications, and/or servers. According to an embodiment, the entire application interface may be written with Express. The application interface may live on AWS Lambda.

Python

Python is a readable programming language used in many places today, especially for small scripts and data analytics. Python may be used for the part of speech analyzer and the document converter. These smaller script Python scripts may all run on AWS Lambda, according to an embodiment.

Real Time Responsive Server Methods and Operations

According to an embodiment, the processing circuitry may be configured to perform one or more real time responsive server methods including one or more of the following operations of the methods described below.

Each of the following methods in FIGS. 2A-2E and other methods described herein may be provided in a browser extension, which is a software module for customizing a web browser, and which can modify the user interface, the functionality or the flow of information to the browser.

Figure 2A:
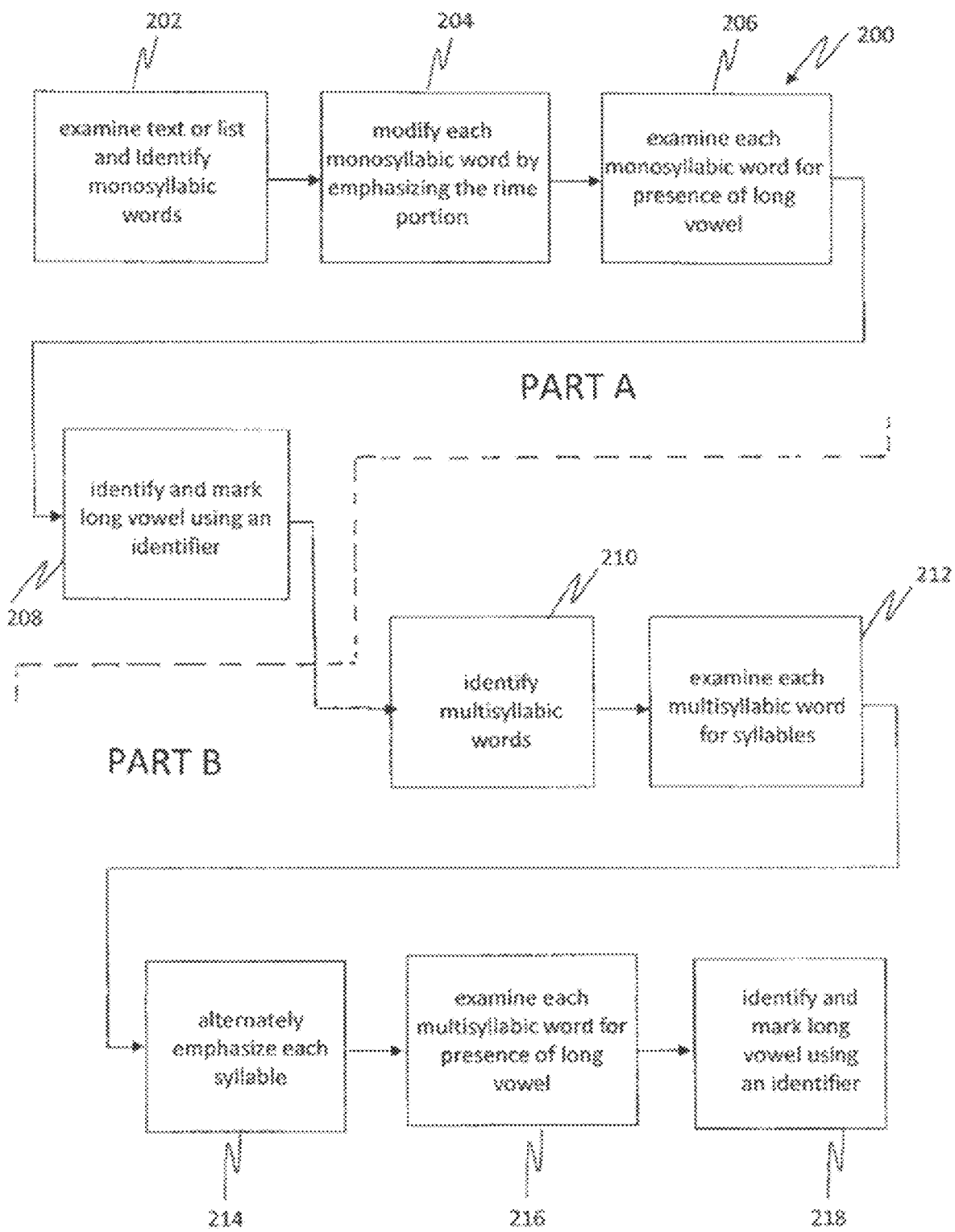
FIG. 2A is an operational block diagram illustrating a method for teaching people with learning difficulties how to read.

FIG. 2A illustrates a flow chart of a real time responsive server method 200 performed by processing circuitry, according to certain embodiments. With reference to FIG. 2A, according to an embodiment, the processing circuitry may be configured to perform a real time responsive server method 200 of controlling a display of an electronic device. The method 200 may include performing processing of specialized text. The processing of specialized text may be performed by a browser extension as discussed below with reference to the methods and operations of FIGS. 2B-2E.

Embodiments may of creating specialized text may employ a typography in which individual original words are "intact", by which is meant that the spacing between letters of a word is in accord with original or standard typography which is most familiar to ordinary literate readers of text printed in paper books and electronically displayed for reading. According to an embodiment, hyphenation may be avoided, but a small amount may be present within what is an intact word text. An intact word may have no significant variation of letter spacing (compared to the original text) beyond that associated with the particular typography, e.g., there may be no separations aimed at aiding a reader to understand or pronounce a word. In some embodiments, each letter may occupy an adjacent same-size space as the original text (e.g., as characterized by Courier New typeface). Typeface refers to a family of fonts composed of letters (glyphs) that share common design features. Typography refers to the style, arrangement, or appearance of alphabetic matter. In some embodiments, the typeface may be characterized by kerning, as characterized by Times New Roman typeface, where the width of space occupied by a letter varies according to the width dimension of the letter.

As described by example below, displays of text or printing according to embodiments may employ a typography which comprises predominately lower case letters. For example, only the initial letters of sentences and initial letters of proper names, etc. may be capitalized. According to an embodiment, the lettering is upright and/or has serifs. Lettering may be printed or displayed in a dark color (e.g., black) on a In an aspect, portions of words in a text are modified to differentiate the portions from each other, to aid those learners who have reading difficulty. The differentiation may comprise use of a means for emphasis which draws a reader's eye to one or more portions of a word by clear differentiation of a portion from plain text. Examples include boldface, font size and an identifier (such as underscore).

FIG. 2A is an operational block diagram that illustrates essential portions of an embodiment 200 of a multi-step method of processing original text to create specialized text, which is divided into Part A and Part B.

Embodiments of the invention may be manifested as a system comprising plurality of text (e.g., from a webpage which may be processed via a browser extension), or lists (e.g., on separate sheets or pages). A system may comprise one or more text documents which communicate fiction or non-fiction stories that may or may not be related to each other. Presenting the learner with an interesting story is a way of generating and holding the person's interest in learning to read. Books using the specialized text comprise paper book/booklet form, e-book form, and displays on the screen of an electronic device that are created by software.

The next part of this description discusses the parts of the method and their relationship. In the following sections, more detail is provided, first for Part A and then for Part B.

In steps 202 through 208 of method Part A, an electronic device (e.g., of a learner user) is first displayed printed matter text comprised of monosyllable words. A syllable is a unit of spoken language that consists of a single uninterrupted sound formed by a vowel and one or more consonants. An exemplary first display consists of text comprising typography wherein the rime portion of a word is emphasized, as by being in bolded font, while the onset portion of the word is in plain font. The linguistic term "rime" refers to letters starting with the vowel which follows the onset, and running to the end of the syllable. The linguistic term "onset" refers to the initial consonant portion of a syllable. In addition, in the specialized text, those vowels which are long vowels may be graphically distinguished from other vowels (short vowels) that are within another monosyllabic word. In the specialized text, according to an embodiment, the way in which the rime portion of a word is emphasized is unique, in that there is no significant separation between the letters compared to that of standard typography, i.e., the word remains intact.

An objective of Part A of the method 200 is to bring predictability to the numerous common words a learning reader is otherwise required to memorize. The emphasized rime enables learners to articulate words appropriately from the beginning, rather than stumbling through, sounding out words left to right, which often necessitates self-correction.

When the learner is focused first on rime, it inhibits giving a sound outside the rime to the other letters of the word. For example, -ou could be -out in shout, -ough in cough, -ould in would, or -ought in thought. Even a simple word like cat necessitates self-correction as the new learner over extends letter sounds, i.e., cuh-a-tuh. There is a difference when a person articulates "c" in cat, compared to the "c" in cut. The sound comes from a different area of the mouth. If the learner is oriented to the rime first, the learner recognizes the -at in cat and the -ould would, eliminating the need to self-correct, enhancing fluency and speed.

Acquiring a rime-based skill enables a learner subsequently to recognize multisyllable words having within them similar rimes to those which were learned. Orienting to the rime also lessens the burden on the learner's working memory, which is often already overstrained in new and struggling readers. Orienting a learner to the rime portion is the basis for fluency in decoding written text. To decode text means to translate a written word into spoken sound and meaning.

A reference describing the technique of improving reading skills by focusing on rime is "Find the Vawol, Read the Rime, Learn to Read" by M. Cherkes-Julkowski, Surviving Education Guides, Apache Junction, Ariz. (2005).

In embodiments, the known Cherkes-Julkowski technique of having a learner orient to rime in monosyllabic words in Part A is combined with the methodology of Part B of method 200, where multisyllabic words are modified.

Multisyllable words have a complex syllable structure due to the complexity of English orthography. As mentioned, Part A seeks to teach the learner to orient to the rime portions of words. That skill positions the learner to decode multisyllable words. It does that because, from an orthographic standpoint, the rime can be viewed as essentially a syllable within a syllable. For example, the rimes -ate in rate, -ight in light, and -ind in mind that are present in single syllable words are present in the multisyllable words such as tolerate, hindsight, and behind. The learner, having acquired knowledge of some regularities and patterns from work with single syllable words, is now positioned better to decode and sound out multisyllable words.

In one aspect, when used with Part A, the method of Part B of the method builds on the skills learned in Part A. Notwithstanding, a reader (e.g., the learner) may have other prior learning, and may alternatively use Part B without first using Part A.

In a nutshell, in Part B the syllables are emphasized without introducing added inter-letter separation (i.e., the words are kept intact). And the long vowels may be emphasized. In Part B, comprising steps 210 through 218, a learner is displayed additional text (e.g., via an electronic display device, or as printed matter in list or text form), which is comprised of a number of multisyllable words. In one embodiment, the syllables of multisyllable words are visually differentiated by preferred emphasis means from each other while the monosyllable words are presented in plain text.

In steps 214 to 218 the long vowels are identified, as by an underscore, to differentiate them from non-long vowels which remain unidentified, additionally. Although it may not often be needed because of progress of the learner, in a variation of the method 200 the monosyllable words that are present also may optionally be displayed as they were in steps 202 through 208, to emphasize the rime portion.

When a learner is successful in showing improved reading ability by using method 200, the specialized text presentation may be removed gradually or entirely, and the reader can be displayed plain text, familiar to non-learners. As an example of partial scaffold removal: if the reader continues to have difficulty with a particular aspect of reading such as vowels, further text with only vowels emphasized may continue to be used.

In carrying out the modification, the preponderance of the words in a text or list is modified. The method is effective even if every one of the monosyllable or multisyllable words is not appropriately modified and all the long and long-with-schwa vowels are not identified. A lot of work can be involved in modifying an existing list or text, or in creating new subject matter. Because of the complex structure of English language and its dialects, substantial word research has been found necessary to try to make modified text as correct and effective as possible.

The next part of this description gives more detail about Part A of method 200.

Figure 3A:
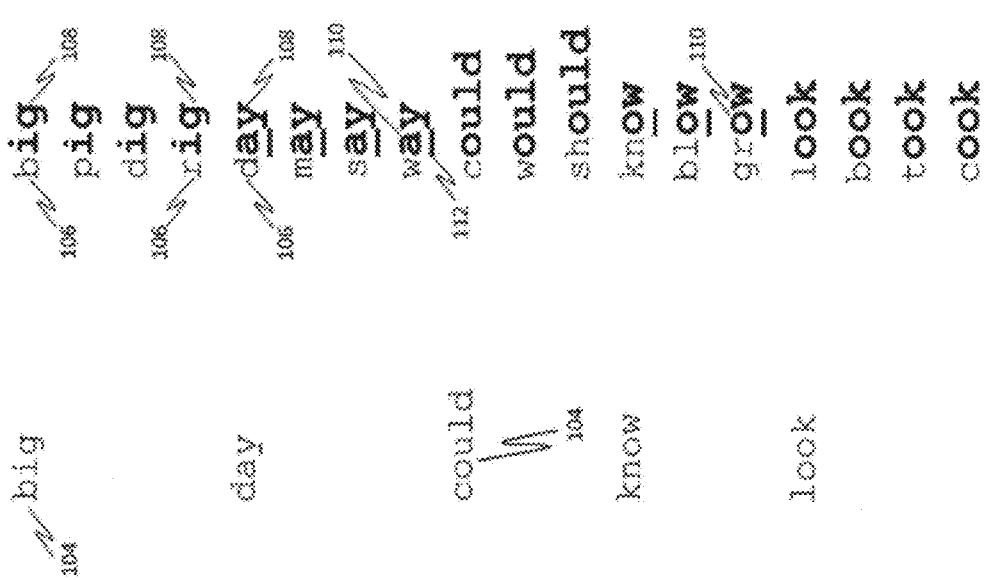
FIG. 3A is a sample set of first grade monosyllabic words along with an expanded set of such words with rime emphasized and long vowels identified.
Figure 3B:
FIG. 3B is a sample paragraph with monosyllabic words, in plain text.

Referring to FIG. 2A and FIG. 3A, method 200 includes composing a text comprised of monosyllabic words 104. Examples of monosyllabic words are shown in FIG. 3A. FIG. 3B is a sample paragraph of text 114 comprised on monosyllabic words in plain font, e.g., a typeface that has consistent design and size from letter to letter, such as the typefaces commonly known as Courier New, New Times Roman, Calibri, etc. Paragraph 114 is written in Courier New.

A paragraph such as sample paragraph 114 may have been first written by an author in plain font, and then operated on, or modified, in accord with the method steps described herein to create specialized text (e.g., to provide text that is then displayed to the learner, such by an electronic device). Alternately, the author may carry out the method in the process of creating original text.

In an embodiment, plain font text is modified and displayed to aid the learner so that selected portions of words are in not-plain or not-standard font, to emphasize those selected portions to the learner. According to an embodiment, the author or an editor (the creator, hereafter), finds in the plain text most if not all of the monosyllabic words 104 using creator's knowledge or using reference works (or specialized software discussed herein). The creator may be a computer program software embodying artificial intelligence. After analyzing each word, the creator may divide the word into a second portion 108 (the rime) by adding emphasis to the rime portion, thus leaving the first portion 106 (the onset) in the original font or another less emphasized state. The aim is to have the learner first look at the rime portion, and then on the onset portion. Thus, for example, the onset portion would not be bolded or otherwise emphasized to make it non-standard in a way which draws the reader's eye. Articles and certain pronouns may be omitted in this and other steps.

In this aspect, there may be no change in letter spacing and no addition of markings to make the rime portion different from plain writing, so as to achieve the objective of enabling decoding, fluency, and obtaining good reading speed. That compares to various other related techniques which only tend to aid de-coding, such as when syllables are spaced apart or when symbols (reflecting another code) are superimposed on words. It is thought that such techniques impede fluency and enhanced reading speed.

Figure 2B:
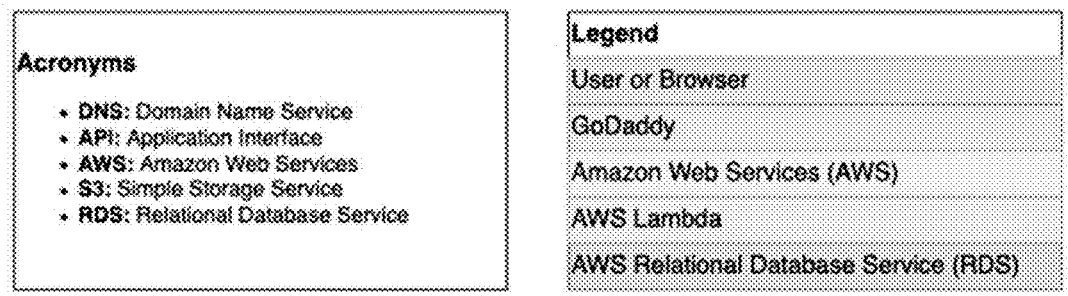
FIGS. 2B-2F illustrate flow charts of real time responsive server methods performed by processing circuitry, according to certain embodiments.
Figure 2B:
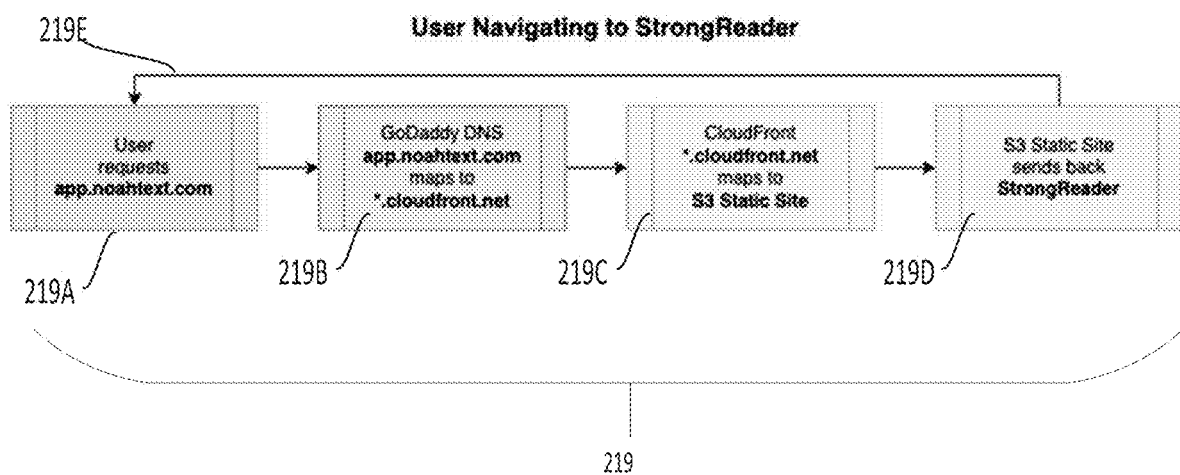

FIG. 2B illustrates a flow chart of a real time responsive server method 219 performed by processing circuitry, according to certain embodiments. With reference to FIG. 2B, according to an embodiment, the processing circuitry may be configured to perform a real time responsive server method 210 of controlling a display of an electronic device (e.g., to navigate a user display to StrongReader, which may include displaying specialized text according to the methodologies discussed herein, such as with reference to FIGS. 2A, and 3A-8), including one or more of the following Operations 219A-219E. For example, the operations may include: a user (e.g., using a web browser) making a request (e.g., for a webpage) via a URL app.noahtext.com (Operation 219A), the domain name registry service (e.g., GoDaddy Domain Name Service (DNS)) may redirect (e.g., via mapping the app.noahtext.com request) to *.cloudfront.net (Operation 219B), CloudFront may then redirect (e.g., by mapping *cloudfront.net) to S3 static site (Operation 219C) and S3 Static Site may send back StrongReader (or the application's webservice)(Operation 219D). After Operation 219D is performed, the method 219 may repeat as shown by arrow 219E, such as for each website/webpage request.

Figure 2C:
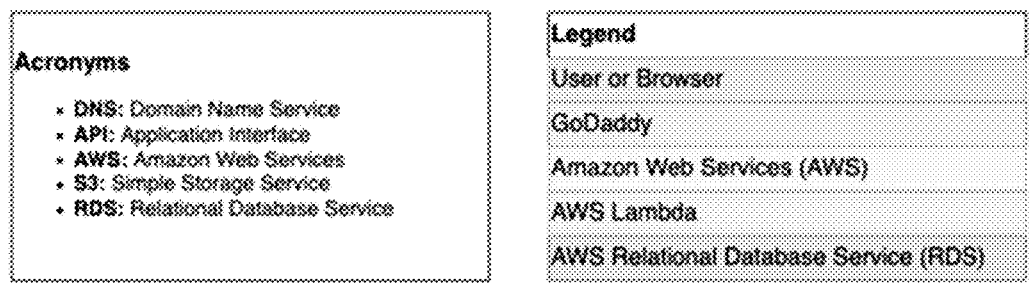
Figure 2C:
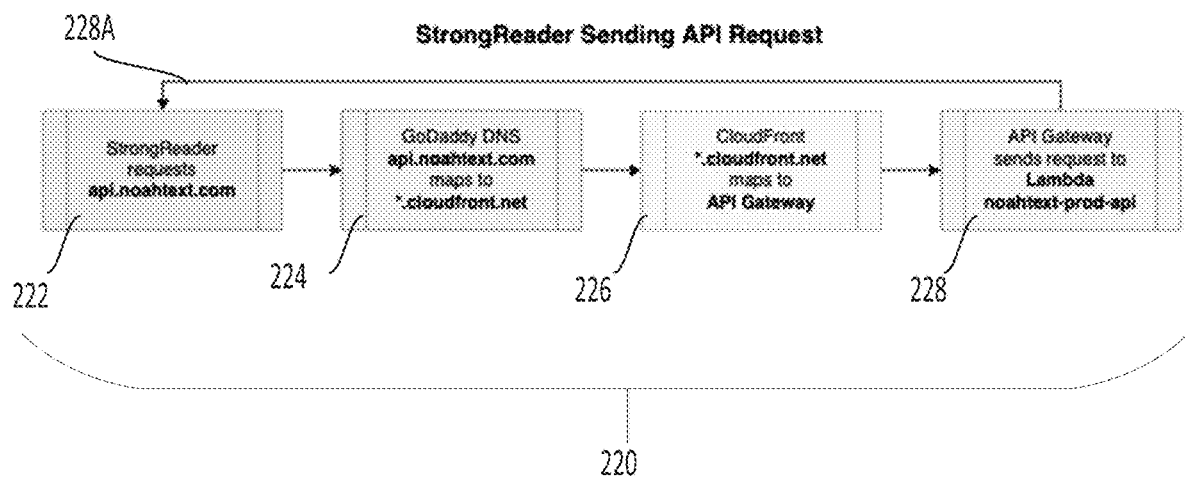

FIG. 2C illustrates a flow chart of a real time responsive server method 220 performed by processing circuitry, according to certain embodiments. With reference to FIG. 2C, according to an embodiment, the processing circuitry (which may include distributed server architecture) may be configured to perform a real time responsive server method 220 of controlling a display of an electronic device (e.g., where StrongReader (e.g., the Browser Extension) sends an API request, including one or more of the following Operations 222-228. For example, the operations may include: StrongReader making a request (e.g., via api.noahtext.com) (Operation 222), the domain name registry service (e.g., GoDaddy Domain Name Service (DNS)) mapping (or redirecting) the app.noahtext.com request to *.cloudfront.net (Operation 224), CloudFront may then map (or redirect) *cloudfront.net to API Gateway (Operation 226) and API Gateway may send a request to AWS Lambda noathext-prod-api. After Operation 228 is performed, the method 220 may repeat (or be recursively performed), such as for each new webpage, as shown by arrow 228A.

Figure 2D:
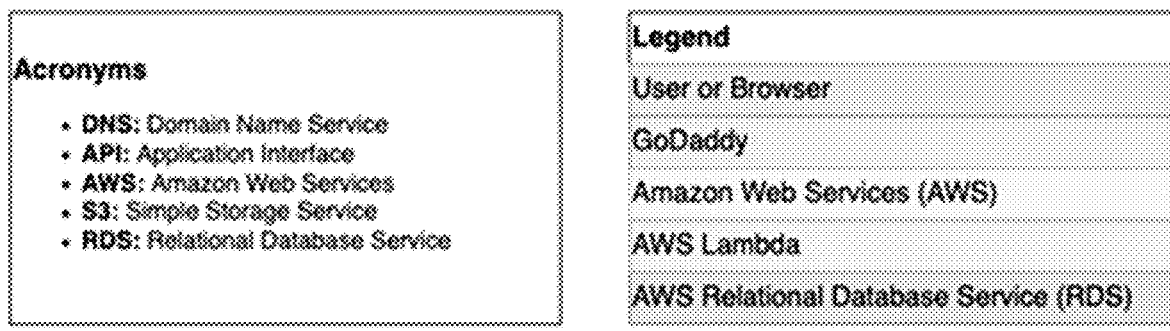
Figure 2D:
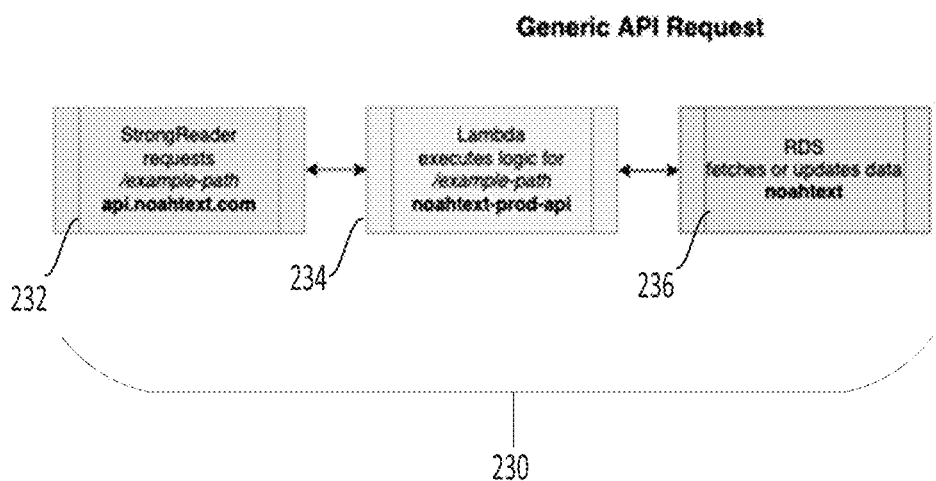

FIG. 2D illustrates a flow chart of a real time responsive server method 230 performed by processing circuitry, according to certain embodiments. With reference to FIG. 2D, according to an embodiment, the processing circuitry may be configured to perform a real time responsive server method 230 of controlling a display of an electronic device (e.g., where StrongReader sends an API request), including one or more of the following Operations 232-236. For example, the operations may include: StrongReader making a webpage request (e.g., /example-path may be sent as the user device's original webpage request to api.noahtext.com) (Operation 232), Lambda executing logic (code) on the text of the webpage corresponding to /example-path via noahtext-prod-api (Operation 234) and the AWS relational database service (RDS) fetching or updating data (e.g., in a document or row called noahtext, which may be stored in a database).

Figure 2E:
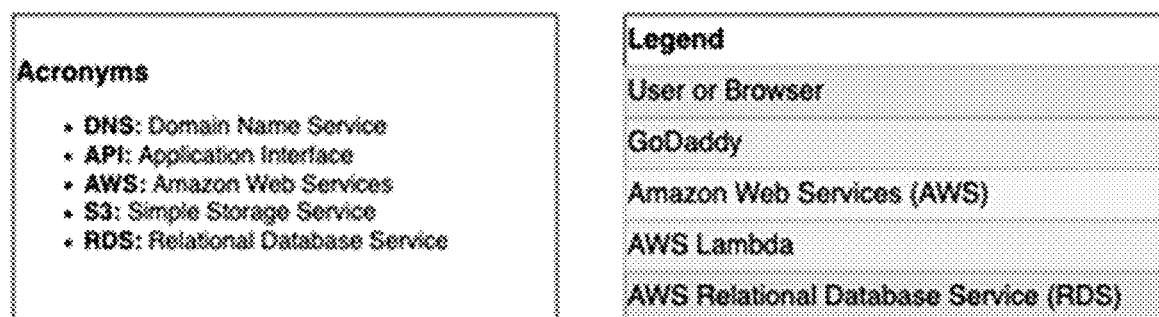
Figure 2E:
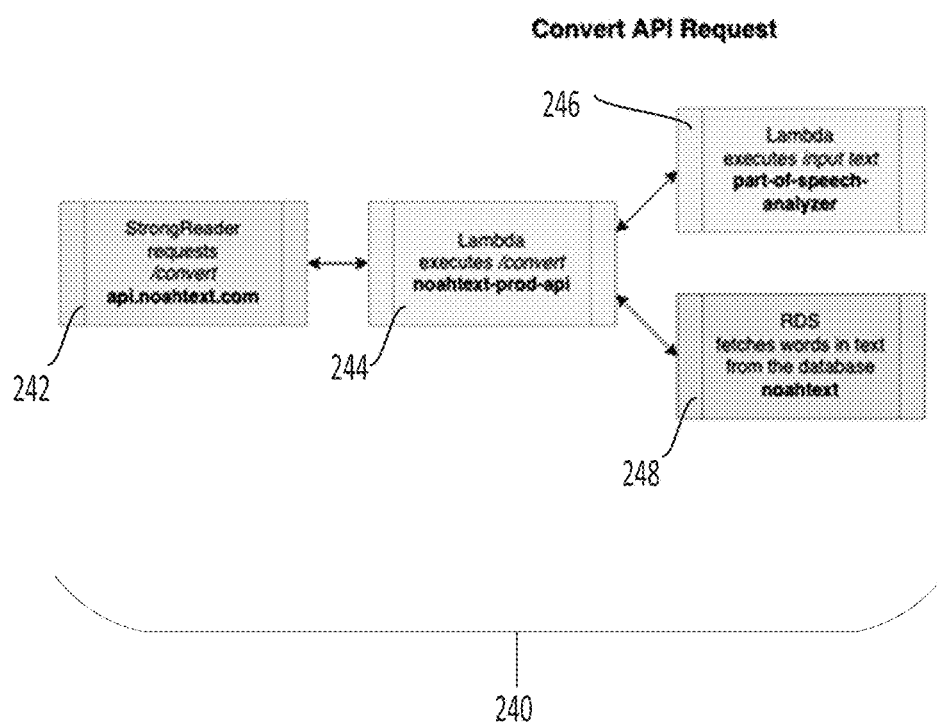

FIG. 2E illustrates a flow chart of a real time responsive server method 240 performed by processing circuitry, according to certain embodiments. With reference to FIG. 2E, according to an embodiment, the processing circuitry may be configured to perform a real time responsive server method 240 of converting an API request, including one or more of the following Operations 242-248. For example, the operations may include: StrongReader making a request (e.g., via requesting /convert api.noahtext.com) (Operation 242), Lambda executing /convert noahtext-prod-api (Operation 244), and transmitting the request to Lambda to perform Operation 246 and/or transmitting the request to the RDS to perform Operation 248. Operation 246 may include Lambda executing input text in a part-of-speech-analyzer. Operation 248 may include the relational database service (RDS) fetching words in text from the database noahtext. The bi-directional arrows in the drawings show data going back and forth between modules and/or servers to perform the method operations.

Figure 2F:
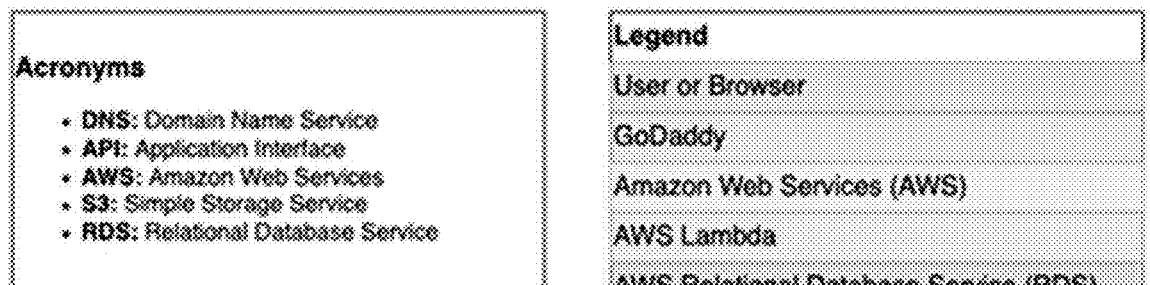
Figure 2F:
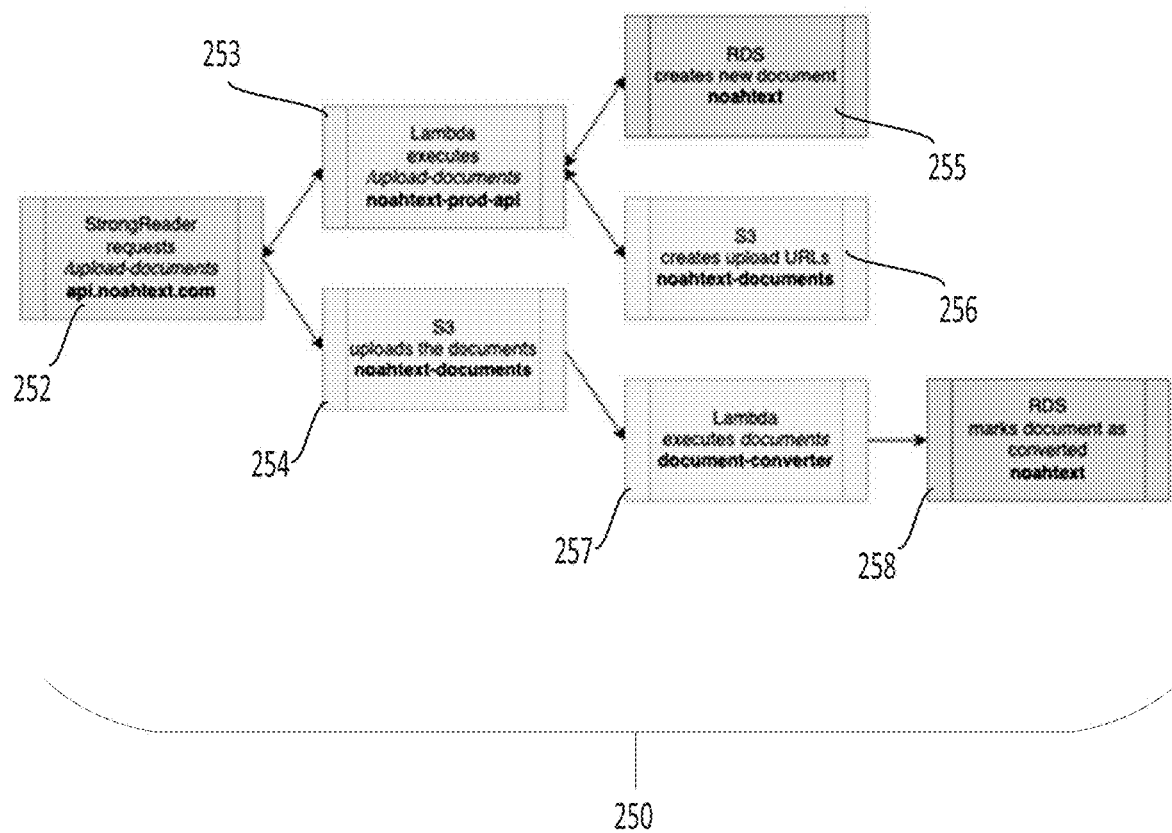

FIG. 2F illustrates a flow chart of a real time responsive server method 250 performed by processing circuitry, according to certain embodiments. With reference to FIG. 2F, according to an embodiment, the processing circuitry may be configured to perform a real time responsive server method 250 of performing a document upload (e.g., via an API request), including one or more of the following Operations 252-258. For example, the operations may include: StrongReader making a request (e.g., via requesting /upload-documents path sent to api.noahtext.com) (Operation 252), Lambda executing /upload-documents path via Noah text-prod-api (Operation 253), which may include communication with RDS (via Operation 255: RDS creating new document Noah text) and communication with S3 (via Operation 256: S3 creates upload URLs noahtext-documents), and S3 uploading the documents Noah text-documents (Operation 254), which may include Lambda executing documents document-converter (Operation 257) and RDS marking the document as a converted document Noah text (Operation 258). The bi-directional arrows in the drawings show data going back and forth between modules and/or servers to perform the method operations.

The specialized text processing may be performed by StrongReader. Referring back to the text examples, in the example of FIGS. 3A-3C, the letters of the onset, first portion 106, of each word 104 have regular font, while the rime, second portion 108 of each word has bolded font. "Bolded" or "bold" means that the letter has more weight, i.e., the elements of the letter are thicker and appears darker than do comparative non-bolded letters. The degree of bolding may be of weight or intensity sufficient to command the attention of a learner looking at the word. For further emphasis, the points of the typeface of second rime portion letters may be made increased from the points of the first portion, so the letters are larger in size. "Points" refers to the size of the space occupied by the greater vertical extension letters, commonly in units of 1/12th of an inch (about 0.2 mm).

In FIG. 3A, according to an embodiment, a sample set of first grade grammar school monosyllabic words 104 is shown in the first (left) column in plain font. The exemplary words are "big," "day," "could," "know" and "look." In the second (right) column each of the words 104 is divided into the first portion (onset) 106 and second portion (rime) 108, emphasized by the boldface font which is also somewhat larger than the plain font. In addition, other words having the same rime as one of the words 104 are written below each word from the first column with the rime portion emphasized by boldface, i.e., "ig," "ay," "ould," "ow" and "ook," respectively. The onset portion 106 of each word, i.e., "b," "d," "c," "kn" and "l," respectively, is in plain font.

In addition, each word in the second column has the vowel underscored, when the vowel is a long vowel. Thus, for example, "a" in "day" the same-sound rime letters are boldfaced and increased in point size. This is discussed further below.

Figure 3C:
FIG. 3C is a sample paragraph of FIG. 3B, with rimes emphasized.

Continuing with respect to rime emphasizing: FIG. 3C shows paragraph 114A, which corresponds to paragraph 114 of FIG. 3B after modifying to carry out the method of ascertaining the rime in each word 104 and distinguishing the rime from the onset by a combination of boldfacing and font size increase in accord with steps 202-204.

Figure 3D:
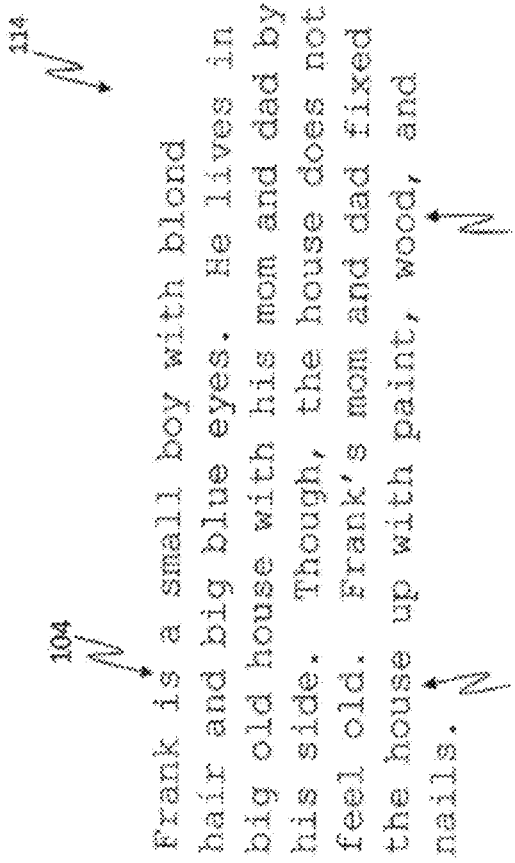
FIG. 3D is a sample paragraph of FIG. 3B, with long vowels identified.
Figure 3E:
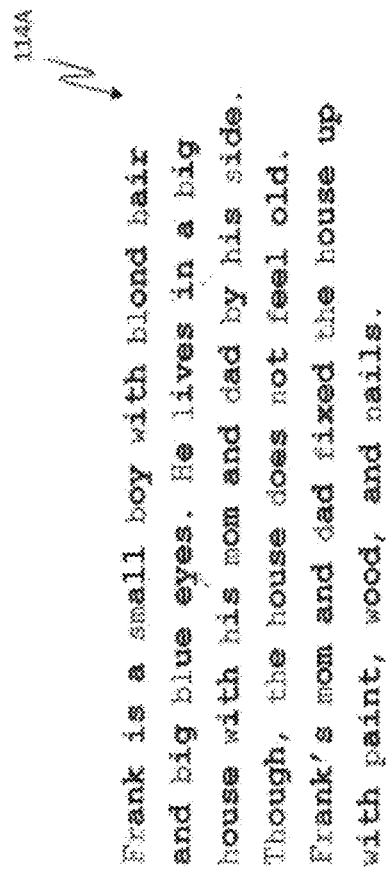
FIG. 3E is the sample paragraph of FIG. 3B having monosyllabic words with both rime emphasized and long vowels identified.

In FIGS. 3A, 3C and 3E, the plain font is Courier New lower case letters having a font size 20 points (preferably with the initial capital letter of any word having a font size of 22 points). In comparison, the rime portions 108 have boldface Courier New with font size 24. In another example, the onset lower case letters may be in regular font which is Times New Roman having font size 12 points and the rime may be Times New Roman font size 14. According to an embodiment, from a readability standpoint, glyphs which are consistent, i.e., all Courier New or all New Times Roman, may be used, in still another example, regular text may be Times New Roman, Font size 12/14 and the rimes may be Courier New Font size 12/14.

As shown by operational block 206, each word 104 is further examined by the creator for the presence of a long vowel 110. When found, the long vowel 110 is emphasized with an identifier 112 as indicated by operational block 208 and FIG. 3A. An identifier is a marking associated with a letter. An exemplary identifier is an underscore.

FIG. 3D shows paragraph 114B, which is the text paragraph of FIG. 3B after it has been modified to identify the long vowels by underscoring, as a result of carrying out steps 206-208. To help the reader more with articulation, long vowels which are pronounced with a schwa sound (i.e., commonly, without accent) are also identified. Examples of words with vowels having schwa sound, with an identifier and syllable emphasis added, are: remark, pronounce, and proficient.

FIG. 3E shows paragraph 114C, which is the text paragraph of FIG. 3A after it has been modified so the rime portions are bolded and the long vowels including those that have schwa have been identified by underscoring, as a result of carrying out the steps 202-208.

The portion of method 200 advantageously allows a learner to appreciate quickly the rime portion and differentiate it from the onset portion, and to know whether the vowel in the word is long, by default, whether it is short. The rime portion is emphasized so it attracts the learner-reader's first attention.

With respect to emphasizing letters in monosyllabic text or multisyllabic text (as described in the next portion of this description), bolding of letters is a preferred way of emphasizing letters. Bolding insubstantially changes the overall letter shape. Bolding avoids adding another kind of a mark or symbol above or below the rime letters because such features tend to draw the eye away undesirably from the letters themselves.

Other modes of emphasis for the rime letters may be used in carrying out embodiments, provide the rime portion will be characterized by letters which "catch the eye" of the reader, compared to the letters which characterize the onset portion. According to an embodiment, such rime letters are said to be more intense. Being more intense is a characteristic of rime letters which are bolded, when onset is in plain font. Other ways of achieving the heightened intensity may be employed. In an example, the onset is in black font while the rime is in a bright color font such as red or orange. In another example, the onset and rime have the same hue, but the rime is either one or more of significantly greater chroma or significantly lesser value, in the colorimetry of the Munsell color system. In another example, the rime is in plain font and the onset is fainter, as is a halftone. In another example, the typeface of the rime portion is more graphically commanding than is the different typeface of the onset portion. Different combinations of the foregoing may be employed. In each example, bolding and greater points may also be applied to the letters of the rime.

It is found that with repeated exposure and learning to the modified monosyllabic-heavy text of FIGS. 3C to 3E, many learners are enabled to decode monosyllabic word text more readily. As now will be detailed, the reading ability that is as a result acquired is helpful with multisyllabic words.

The next part of this description gives more detail about Part B of method 200.

Figure 4:
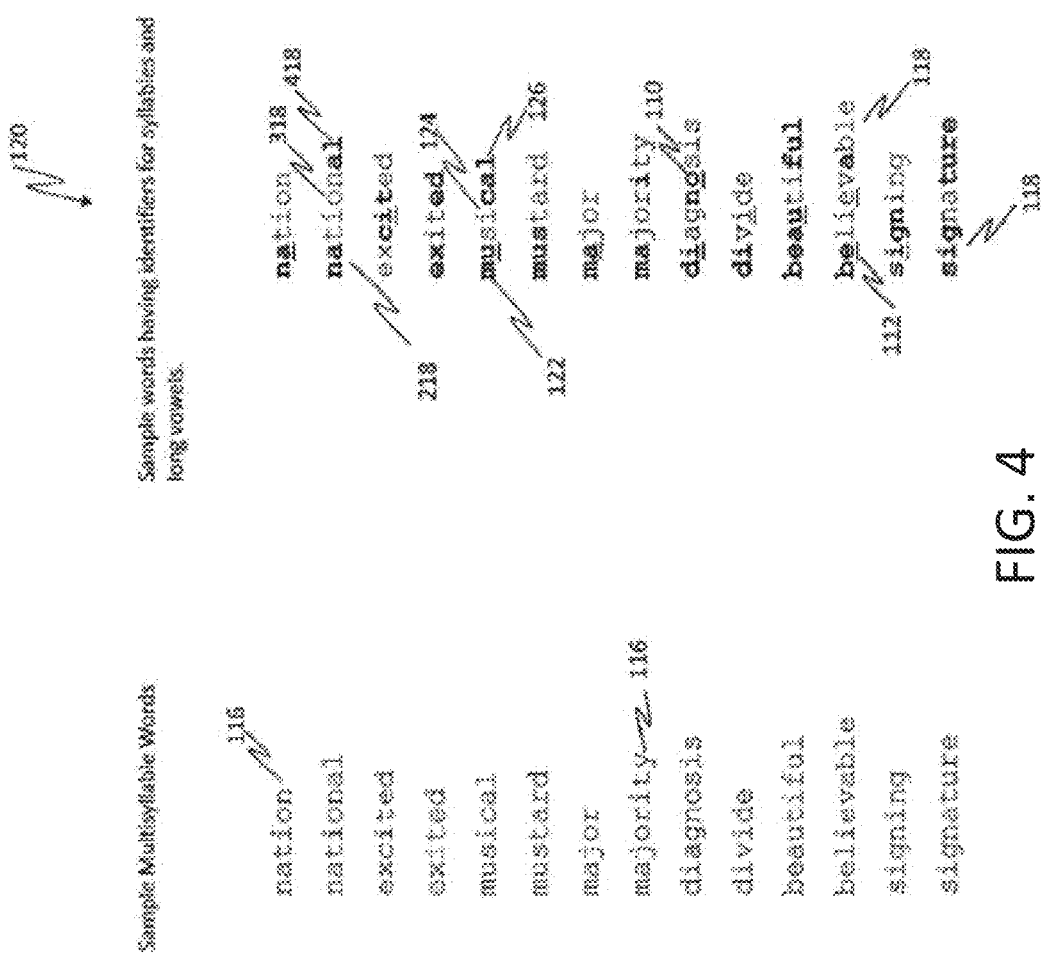
FIG. 4 is a sample set of multisyllabic words and a corresponding set of those words with syllables and long vowels identified.

Part B of method 200, steps 210 to 218, helps the learner to recognize and learn words having multiple syllables. In a list or text, each of a plurality of the multisyllabic words 116 is ascertained, as shown by operational block 210; each word is examined to find the syllables 118, as shown by operational block 212. With reference to FIG. 4 each of the syllables 118 are then differentiated from adjacent syllables, as indicated by operational block 214 so the syllables 118 may be quickly recognized by the learner.

Referring to FIG. 4, a sample set 120 of multisyllabic words 116 of the kind that seem tricky to many kinds of poor readers is shown in plain font in the left column. In the second (right side) column, each word 116 is set forth with emphasis on syllables 118, but a way which does not separate the letters of the word any more than in standard intact word text. In the example, bolding of the type is used. Optionally, some change in points may also be employed. The method of differentiating syllables avoids such as use of inter-syllable bullets (dots), substitutional accent marks, and associated spacing between letters that dictionaries and other teaching publications use. Reading speed is impaired when letters or letter-sets of a word are separated (as by dots or spaces), and the invention overcomes that limitation.

For example, referring to the sample set 120, the word 110 "national" has three syllables, a first syllable 218, a second syllable 318 and a third syllable 418. In the modification of the words, the sequential syllables are indicated by alternately emphasizing and not emphasizing each syllable. Thus the first and third syllables ("na" and "tion") are bolded and the middle syllable is not. As another example, the word "musical" has the first syllable 122 "mu" bolded; the third syllable 126 "cal" bolded, and contiguous/intervening second syllable 124 "si" is in plain font.

Additionally, as with monosyllabic words, each multisyllabic word 116 may be further examined for the presence of the long vowel 110, as shown by operational block 216 and the list of FIG. 3C. When a long vowel 110 is present, it is associated with a long vowel identifier 112, for example, an underscore in accord with operational block 218. Other identifiers may be used for long vowels including those long vowels with schwa. For example, other identifiers include a line above the vowel (i.e., over-score); one or more dots or other accent symbols below or above the vowel.

FIG. 5 shows sample text paragraph 128 in plain font. The text 128 may be referred to as "higher level text", in comparison to the text of FIG. 3B and paragraph 114, because of the presence of both monosyllabic and multisyllabic words and more complex grammar and sentence structure.

The text paragraph 128A in FIG. 6 displays how the text of FIG. 5 appears after it has been modified by carrying out steps 210-214 to emphasize the syllables.

The text paragraph 128B in FIG. 7 displays how the text of FIG. 5 appears after it has been modified by carrying out steps 216-218 to emphasize the long vowels including those with schwa.

The text paragraph 128C in FIG. 8 displays how the text of FIG. 5 appears after it has been modified by carrying out all the steps 210-218 to emphasize both the syllables and long vowels including those with schwa.

As mentioned above, while ordinarily the progress of the learner will not indicate a need, an option is further to modify text like paragraph 128C so that the monosyllable words that are present are displayed as they were when the text comprised predominately monosyllabic words, as in paragraph 114A.

With multisyllabic words an object is to impart to the syllables significant differentiation, from one letter set (syllable) to the next, sufficient for the normal human eye to easily perceive the difference. It is not necessary that one particular syllable "catch the eye" more than another syllable in the same word, as compared to the approach for rime/onset. Black typeface is preferred because most commonly documents are displayed in such fashion, and thus the desired differentiation is achieved by an intensity difference which is preferably bolding and not-bolding.

Other ways of achieving differentiation amongst syllables may be employed. In an example, syllables alternate from black font to color font; or syllables in color change significantly in chroma or value. (Avoiding bolding, and for example changing color, may be preferred in order to avoid changing the typography (i.e., the total length of a string of paragraph text) of an extant document being modified to carry out the invention—such as where there are also Figures related to the text.) In another, the syllables alternate between plain font and font which is fainter, as is a halftone. In another example, the typefaces are substantially different. All the foregoing are considered to entail use of different fonts, within the claims of the present invention. Different combinations of the foregoing may be employed. Some of the foregoing exemplary modes may be more effective than others, with respect to preparing a learner to read text in conventional typography that will be encountered outside the learning environment.

The second portion of method 200 that was just described advantageously allows a learner quickly to mentally sound multisyllable words and to understand whether or not the vowel in the word is long or short. Because the preferred emphasis (alternating bold and plain sets of letters) do not space apart the syllables of word, the learner is more attuned to anticipating and reading other commonplace texts he or she will encounter in future daily life. It is found that with repeated exposure and learning to the modified text many learners become more capable of decoding both monosyllabic and multisyllabic words, similar to what readers would be able to do if the English language had a consistent and therefore predictable orthography.

Depending on the amount of learning disability of the learner and the progression of the learner's overcoming of such, using the method and system of the present invention may be carried out in modified form with time, i.e., the scaffolding that comprises the method/system may be gradually removed. For example, there may be only highlighting of those portions of words with which the learner has trouble. So, if the learner is not having problems with the vowels, then only the rime/onset pairs might be highlighted, or vice versa. When a learner has advanced sufficiently in reading capacity, text without any modification be displayed for reading, along the lines of the text shown in FIG. 3B or FIG. 5, depending on the level of achievement of the learner.

Each of the specialized text in FIGS. 3A-8 may correspond to text displayed in a web browser. In particular, the methods of FIGS. 2B-2F may be used to provide a browser extension, which may be used to perform the conversion from ordinary text to specialized text (shown in FIGS. 3A-8).

Other methods of processing original text to provide assistive technology may include one or more of emphasizing the monosyllable or multisyllable words by creating EPUB conversion capabilities, creating PDF conversion capabilities, creating Google Doc conversion capabilities, creating Amazon Kindle conversion capabilities and/or creating an offline version for localized implementation. Currently, embodiments of the assistive technology may convert Microsoft word docs when uploaded online.

While the embodiments have been described in terms of English language, to the extent other languages present some of the same kind of orthographic difficulties to the learner, the method may be utilized with those other languages.

While the embodiments have been described with reference to exemplary embodiments, it will be understood by those skilled in the art that various changes, omissions and/or additions may be made and equivalents may be substituted for elements thereof without departing from the spirit and scope of the invention. The claimed invention shall not be limited to a particular embodiment disclosed herein. Elements of one embodiment may be combined with elements of other embodiments. Any use of words such as "preferred" and variations suggest a feature or combination which is desirable but which is not necessarily mandatory.

Thus, embodiments lacking any such preferred feature or combination may be within the scope of the claims which follow.

The invention claimed is:

1. A server system comprising:
a network communication interface; and
processing circuitry configured to:
receive a webpage request from a user electronic device via a browser extension;
access text associated with a webpage corresponding to the webpage request;
process the accessed text to generate specialized text, comprising:
detecting a plurality of orthographic monosyllable words and a plurality of orthographic multisyllable words in the accessed text;
analyzing and dividing at least one orthographic multisyllable word of the plurality of orthographic multisyllable words into two or more sequential syllables;
modifying the accessed text to generate the specialized text, comprising:
adding emphasis to the two or more sequential syllables by alternating plain font with emphasized font while maintaining spacing between letters of the at least one orthographic multisyllable word in accord with a standard typography;
graphically distinguishing orthographic long vowels from orthographic short vowels in the plurality of orthographic monosyllable words and the plurality of orthographic multisyllable words; and
leaving the plurality of orthographic monosyllable words in an original non-emphasized font; and
control the network communication interface to transmit, to the user electronic device, webpage information with the specialized text as a response to the webpage request.

2. The server system of claim 1, wherein the graphically distinguishing the orthographic long vowels from the orthographic short vowels in the plurality of orthographic monosyllable words and the plurality of orthographic multisyllable words includes underscoring the orthographic long vowels in the plurality of orthographic monosyllable words and the plurality of orthographic multisyllable words, while not underscoring orthographic short vowels in the plurality of orthographic monosyllable words and the plurality of orthographic multisyllable words.

3. The server system of claim 1, wherein the emphasized font is a bolded font, and the original non-emphasized font is not bolded.

4. The server system of claim 1, wherein the processing of the accessed text to generate the specialized text may include: generating a list of words associated with long vowels of each word; using a dictionary API to determine syllable breakdowns of each word; and using a parts of speech analyzer and a document converter to modify the accessed text.

5. An electronic method implemented by a server system, the electronic method comprising:
receiving, via a network communication interface, a webpage request from a user electronic device running a web browser extension;
accessing text associated with a webpage corresponding to the webpage request;
processing the accessed text to generate specialized text, comprising:
detecting a plurality of orthographic monosyllable words and a plurality of orthographic multisyllable words in the accessed text;
analyzing and dividing at least one orthographic multisyllable word of the plurality of orthographic multisyllable words into two or more sequential syllables;
modifying the accessed text to generate the specialized text, comprising:
adding emphasis to the two or more sequential syllables by alternating plain font with emphasized font while maintaining spacing between letters of the at least one orthographic multisyllable word in accord with a standard typography;
graphically distinguishing orthographic long vowels from orthographic short vowels in the plurality of orthographic monosyllable words and the plurality of orthographic multisyllable words; and
leaving the plurality of orthographic monosyllable words in an original non-emphasized font; and
transmitting, via a network communication interface, to the user electronic device, webpage information with the specialized text as a response to the webpage request.

6. The electronic method of claim 5, wherein the emphasized font is a bolded font, and the original non-emphasized font is not bolded.

7. The electronic method of claim 5, wherein the graphically distinguishing the orthographic long vowels from the orthographic short vowels in the plurality of orthographic monosyllable words and the plurality of orthographic multisyllable words includes underscoring the orthographic long vowels in the plurality of orthographic monosyllable words and the plurality of orthographic multisyllable words, while not underscoring orthographic short vowels in the plurality of orthographic monosyllable words and the plurality of orthographic multisyllable words.

8. The electronic method of claim 5, wherein the processing of the accessed text to create the specialized text includes at least one of: generating a list of words associated with long vowels of each word; using a dictionary API to determine syllable breakdowns of each word; and using a parts of speech analyzer and a document converter to provide a modified version of the text.

* * * * *